United States Patent
Sugitani et al.

(10) Patent No.: US 6,239,568 B1
(45) Date of Patent: May 29, 2001

(54) STEERING CONTROL APPARATUS

(75) Inventors: Nobuyoshi Sugitani, Susono; Hiroshi Kawaguchi, Mishima, both of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/468,358

(22) Filed: Dec. 21, 1999

(30) Foreign Application Priority Data

Dec. 25, 1998 (JP) .................................................. 10-370251
Mar. 8, 1999 (JP) .................................................. 11-060436

(51) Int. Cl.$^7$ .................................................. G05B 5/00
(52) U.S. Cl. .............................. 318/466; 701/72; 701/41; 180/140
(58) Field of Search ........................... 318/466; 180/140; 701/72, 41

(56) References Cited

U.S. PATENT DOCUMENTS

| | | | |
|---|---|---|---|
| 4,669,745 | * 6/1987 | Miki et al. | 180/140 |
| 5,365,439 | * 11/1994 | Momose et al. | 180/140 |
| 5,754,966 | * 5/1998 | Ichikawa et al. | 180/410 |
| 5,964,819 | * 10/1999 | Naito | 701/72 |

FOREIGN PATENT DOCUMENTS

| 63-291769 | 11/1988 | (JP) . |
|---|---|---|
| 63-306972 | 12/1988 | (JP) . |
| 3-14771 | 1/1991 | (JP) . |

\* cited by examiner

*Primary Examiner*—Karen Masih
(74) *Attorney, Agent, or Firm*—Oliff & Berridge, PLC

(57) ABSTRACT

A steering control apparatus of the present invention has an actuator interposed in a steering system between a steering wheel and road wheels, for exerting a driving force on the steering system, and a phase control for controlling the phase of a steering reaction force acting on the steering wheel through the steering system, and can thus control a hysteresis width in a steering-wheel angle versus steering reaction force characteristic, whereby the hysteresis width can be set arbitrarily and changed suitably.

15 Claims, 30 Drawing Sheets

······ HIGH SPEED
——— LOW SPEED

A-A SECTION

B-B SECTION

STEERING CONTROL APPARATUS

BACKGROUND OF THE INVENTION

1. Field of the Invention

The present invention relates to a steering control apparatus which carries out control of steering reaction force.

2. Related Background Art

A conventionally known example of the apparatus for the control of steering reaction force is a so-called power steering system in which an assisting force produced by driving force of an electric motor or by an oil pressure is exerted on a steering system according to a steering torque detected, during steering operation. In this case, the steering reaction force decreases with increasing assisting force, whereas the steering reaction force increases with decreasing assisting force (Japanese Patent Application Laid-Open No. Sho63-306972 etc.).

SUMMARY OF THE INVENTION

FIG. 1 shows the relation between steering-wheel angle θ of the steering wheel and steering reaction force MT acting on the steering wheel. The characteristic of steering-wheel angle θ versus steering reaction force MT illustrated in FIG. 1 is the result of detection in which a vehicle equipped with the power steering system was driven on the slalom course so as to vary the steering-wheel angle θ sinusoidally and in which transition of the steering reaction force MT on that occasion was detected. In the figure, a characteristic curve indicated by a solid line represents the result of the detection where the vehicle was driven at medium speed, and a characteristic curve indicated by a dotted line the result of the detection where the vehicle was driven at high speed.

There is a phase difference between steering-wheel angle θ and steering reaction force MT. And the phase of steering reaction force MT leads the steering-wheel angle θ. For that reason the two characteristic curves are Lissajous loops which are convex up. Noting hysteresis widths of these Lissajous loops, the hysteresis width at high speed is smaller than that at medium speed and, particularly near the neutral position of steering angle (near the steering-wheel angle θ=0), the hysteresis width wh at high speed is considerably smaller than the hysteresis width wm at medium speed.

To keep a fixed driving direction of the vehicle, a driver needs to keep holding forces constant on the steering wheel so as to keep a fixed steering-wheel angle. This is, however, not easy in practice, as empirically known. Even if there occurs a little change in a balance of the holding forces or even if an external force from road wheels is exerted on the steering wheel to finely change the steering reaction force, the steering wheel will keep the same steering-wheel angle as long as such change of force is within the magnitude of hysteresis as illustrated. In other words, if the hysteresis width is small, small change in the steering force or the external force will appear as change of the steering-wheel angle θ. Therefore, when the hysteresis width becomes smaller at higher speed as illustrated in FIG. 1, the steering-wheel angle θ reacts sensitive to even small change in the steering force or the external force, so that steering feeling varies depending upon vehicle speed.

The hysteresis width can be increased by enhancing transmission rigidity between the steering wheel and the tires (steered road wheels), but in this case greater vibration will be transmitted from the road surface to the vehicle body, which will degrade the ride quality of the car.

The present invention has been accomplished in order to solve the problem described above and an object of the invention is to provide a steering control apparatus capable of adjusting the hysteresis width in the characteristic of the steering-wheel angle versus steering reaction force without use of mechanical techniques which can sacrifice the ride quality.

The steering control apparatus of the present invention is a steering control apparatus for control of steering reaction force, which comprises an actuator interposed in a steering system between a steering wheel and steered road wheels, for supplying driving force to the steering system, and phase control means for controlling a phase of steering reaction force acting on the steering wheel through the steering system, by controlling driving of the actuator.

Since the driving force of the actuator acts upon the steering wheel in addition to the frictional force of the steering system and the external force from the road wheels. The frictional force of the steering system and the external force from the road wheels are the original components of the steering reaction force. A resultant force of these forces acts as a steering reaction force on the steering wheel. Accordingly, the phase of the steering reaction force acting on the steering wheel can be changed by controlling the driving force of the actuator. The phase control means controls the phase of the steering reaction force acting on the steering wheel, by controlling the driving of the actuator.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

First described is the phenomenon of the change in the hysteresis width of the steering-wheel angle versus steering reaction force characteristic.

Figure 2:
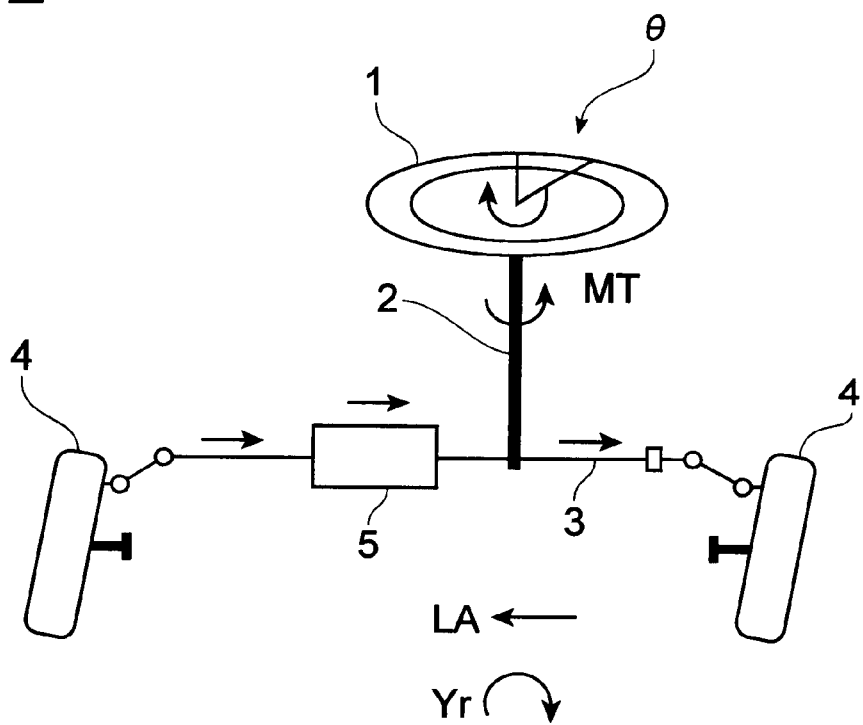
FIG. 2 is a diagram to schematically show the steering system from the steering wheel to the steered road wheels and to show a changing direction of the steering-wheel angle θ and directions of the steering reaction force MT, lateral acceleration LA, and yaw rate Yr according thereto.

As illustrated in FIG. 2, the steering wheel 1 is connected via a steering shaft 2 to an axle shaft 3 and the steered road wheels 4 are connected to the both ends of the axle shaft 3. The axle shaft 3 is equipped with an assist motor 5 for generating the assisting force. The assist motor 5 is drived to displace the axle shaft 3.

Component forces of the steering reaction force MT will be described herein.

Figure 3:
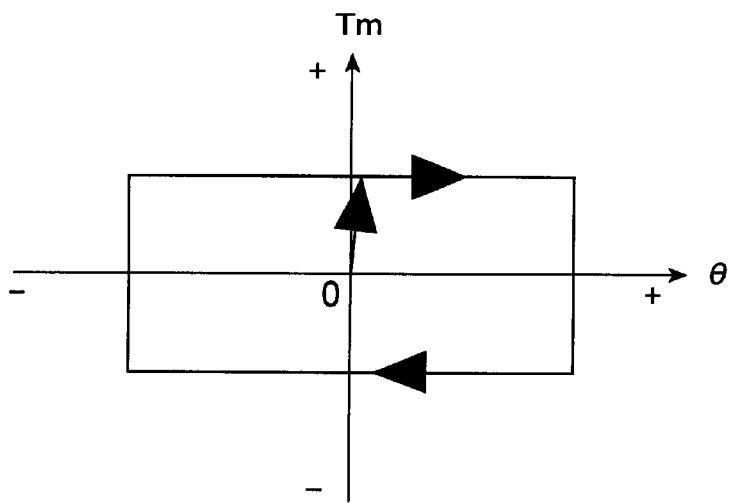
FIG. 3 is a diagram to show the characteristic of steering-wheel angle θ versus frictional force Tm.

When the driver exerts a steering force on the steering wheel 1 to rotate it, that force causes a steering reaction force MT to appear. There is a frictional force in the steering system in which the steering wheel 1 is coupled. Thus the steering wheel 1 does not rotate unless the steering reaction force MT exceeds this frictional force. Therefore, the steering-wheel angle θ lags the steering reaction force MT by the phase of this frictional force. Such reaction force due to the frictional force Tm of the steering system is composed of the frictional force in the steering shaft 2 and the frictional force in a gear box. And such reaction force is not proportional to steering speed, vehicle speed or the like. And such reaction force appears as a force opposing the steering direction, as illustrated in FIG. 3. As described previously, since the steering-wheel angle θ starts to rotate when the force exerted on the steering wheel 1 becomes over the frictional force Tm, the phase of the frictional force Tm leads the steering-wheel angle θ and the frictional force Tm draws Lissajous curves convex up, against steering-wheel angles θ on the axis of abscissas.

Figure 4:
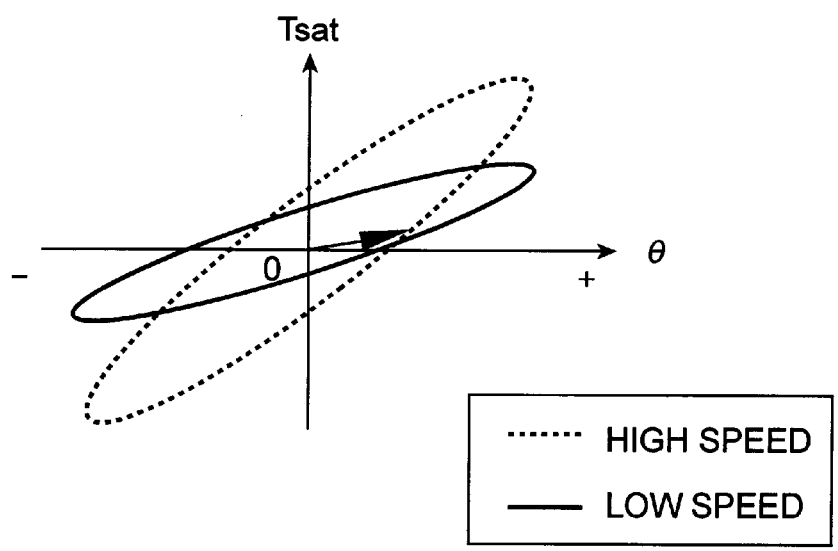
FIG. 4 is a diagram to show the characteristics of steering-wheel angle θ versus tire reaction force Tsat at high speed and at low speed.

When the steering wheel 1 starts rotating to change the steering-wheel angle θ, the axle shaft 3 mechanically coupled via the steering shaft 2 is displaced to steer the wheels 4. This changes the running direction of the vehicle and a self-aligning torque appears in the wheels 4, whereupon the lateral acceleration LA and yaw rate Yr act on the vehicle. The external force (tire reaction) Tsat acting from the wheels 4 on the steering system, based on such self-aligning torque, is converted to a force working to twist the steering shaft 2, which is incorporated in the steering reaction force MT. Therefore, the tire reaction force Tsat has a phase lag behind the steering-wheel angle θ and draws Lissajous loops convex down, against steering-wheel angles θ on the axis of abscissas, as illustrated in FIG. 4. The higher the vehicle speed, the greater the phase lag of the tire reaction force Tsat behind the steering-wheel angle θ; therefore, the higher the vehicle speed, the greater the hysteresis width of Lissajous loop. Further, since the lateral acceleration LA, which is an index indicating the tire reaction force Tsat, is proportional to $V^2/R$ (where V is the vehicle speed and R is a turning radius), the lateral acceleration LA increases in proportion to the square of the vehicle speed even at the same steering-wheel angle θ. This action makes an inclination of the Lissajous loop of FIG. 4 at high speed greater than that at low speed. This is the reason why the steering reaction force increases with increasing vehicle speed even at the same steering-wheel angle θ.

Figure 5:
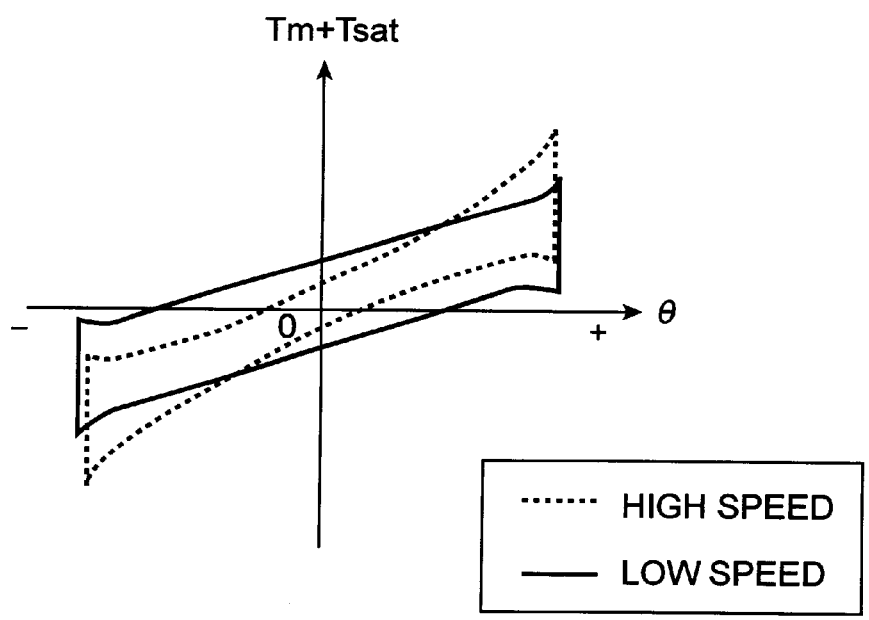
FIG. 5 is a diagram to show the characteristic between the resultant reaction force (Tm+Tsat) and the steering-wheel angle θ.

Both these frictional force Tm and tire reaction force Tsat act as the steering reaction force MT and the resultant of these forces is as illustrated in FIG. 5. It is seen that the inclination increases as the vehicle speed increases but the hysteresis width near the steering-wheel angle=0 decreases, because the phase lag of the tire reaction force Tsat increases.

Since the assisting force PS produced by the assist motor 5 acts to decrease the steering reaction force MT, the relation among the steering reaction force MT, frictional force Tm, tire reaction force Tsat, and assisting force PS can be expressed by Eq. (1) below.

$$MT = Tm + Tsat - PS \tag{1}$$

Figure 6:
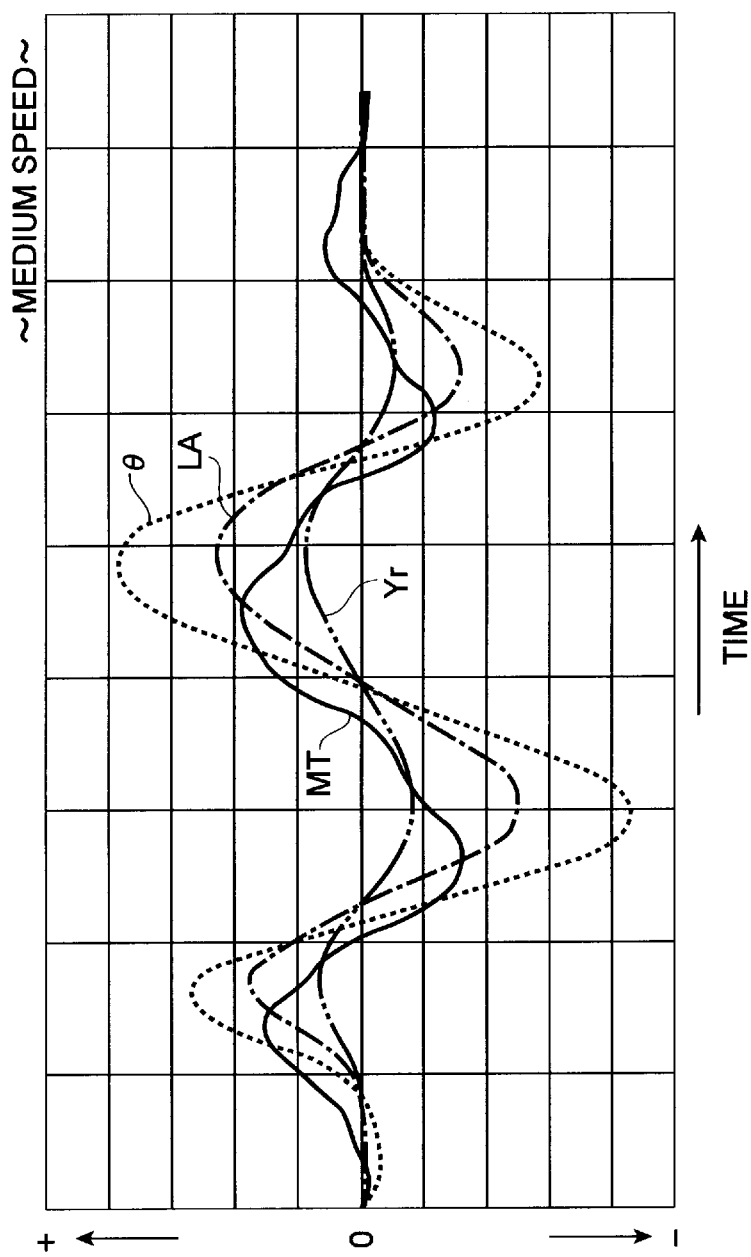
FIG. 6 is a diagram to show temporal transition curves of detection results etc. at medium speed.
Figure 7:
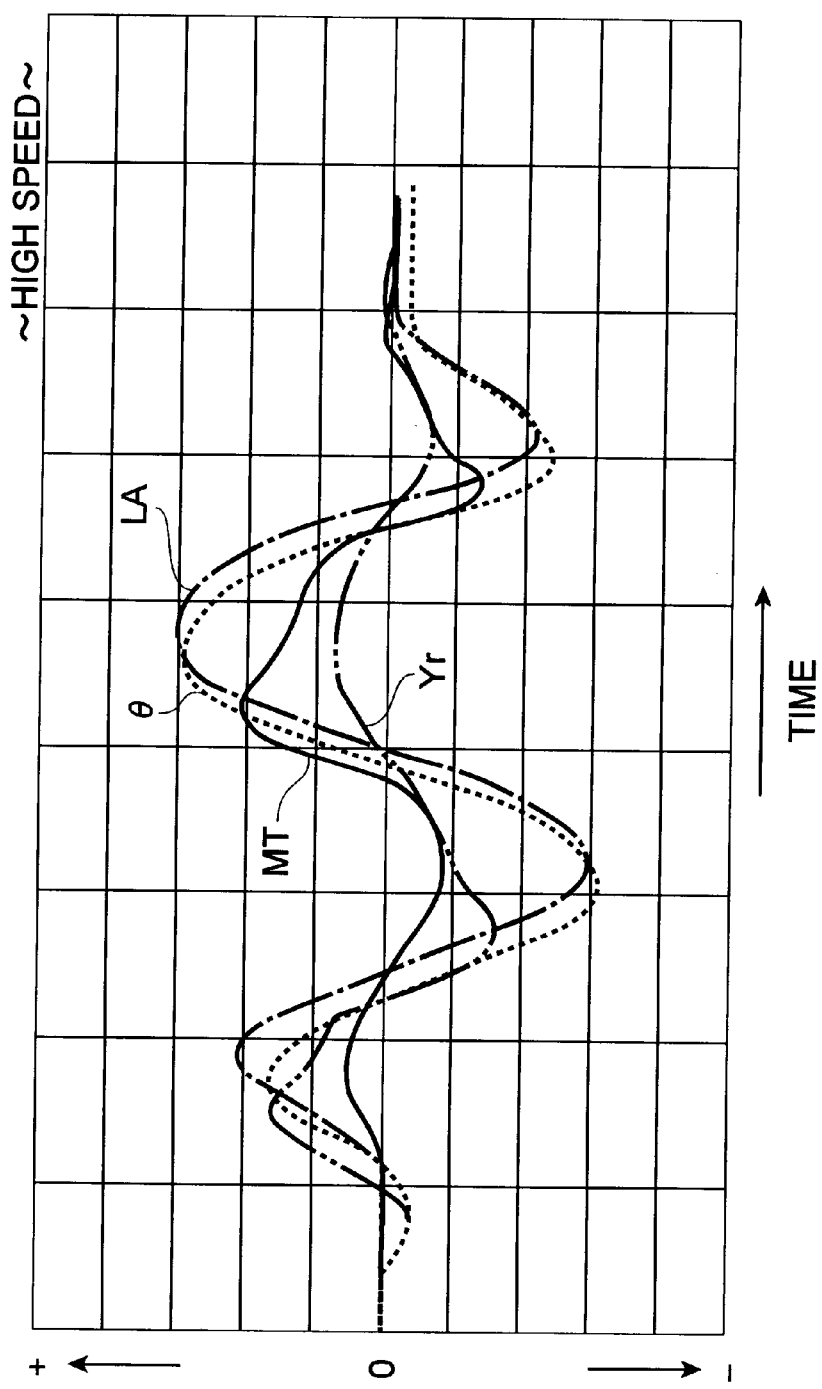
FIG. 7 is a diagram to show temporal transition curves of detection results etc. at high speed.

FIG. 6 and FIG. 7 show the detection results of the steering reaction force MT, the steering-wheel angle θ, the lateral acceleration LA, and the yaw rate Yr in an actually running vehicle. These results were obtained as follows; the vehicle equipped with the steering system of FIG. 2 was made to slalom on a course with pylons placed at equal intervals and each detection result obtained was indicated as time-series data in cases where the vehicle speed was the medium speed of about 50 km/h (FIG. 6) and the high speed of about 80 km/h (FIG. 7). Each detected value is indicated while the positive direction is defined along the direction of each arrow illustrated in FIG. 2, and this definition of directions is also used as a reference in the embodiments described below.

Figure 1:
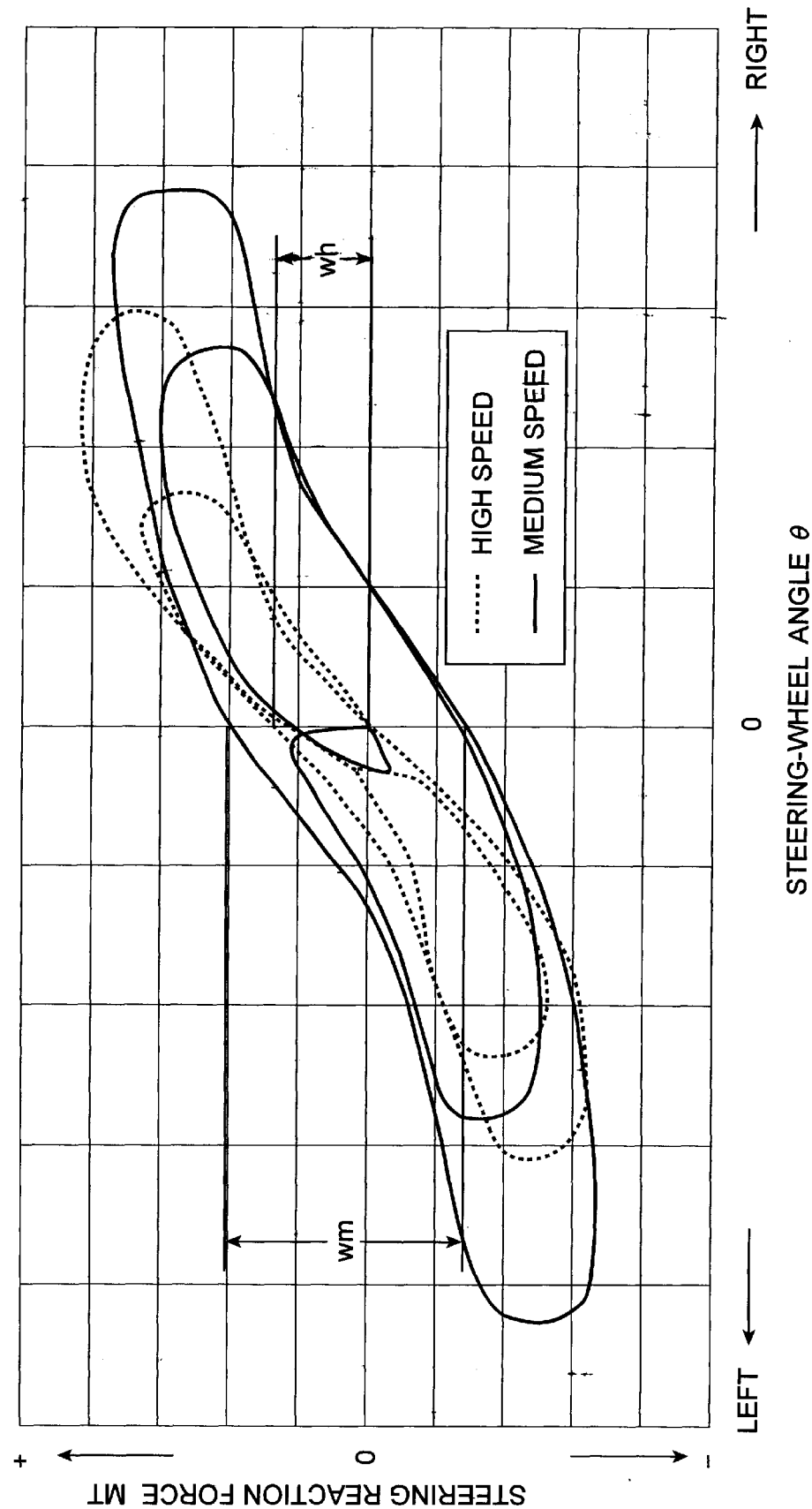
FIG. 1 is a diagram to show the characteristics of steering-wheel angle θ versus steering reaction force MT at medium speed and at high speed.

In the time-series data of the medium speed (FIG. 6), the steering reaction force MT precedes, the steering-wheel angle θ follows thereafter, and then the lateral acceleration LA and yaw rate Yr are detected almost in almost same phase. In contrast with it, in the time-series data of the high speed (FIG. 7), the phase lags of the lateral acceleration LA and yaw rate Yr behind the steering-wheel angle θ are larger and the phase lead of the steering reaction force MT ahead the steering-wheel angle θ is smaller. The reason is, as described previously, that the phase lag of the tire reaction force Tsat behind the steering-wheel angle θ increases with increasing vehicle speed and this results in suppressing the phase lead of the steering reaction force MT ahead the steering-wheel angle θ to decrease the hysteresis width illustrated in FIG. 1 or in FIG. 5.

This action varies the characteristic of the hysteresis width of the steering-wheel angle versus steering reaction force and, in other words, this hysteresis width can be controlled by controlling the phase of the steering reaction force MT against the steering-wheel angle θ.

Then, let us explain a technique of changing the phase of the steering reaction force MT against the steering-wheel angle θ. A vehicle state quantity, which indicates a characteristic similar to the tire reaction force Tsat described above, is, for example, the lateral acceleration LA. By inverting signs of a detection signal of the lateral acceleration LA, we obtain a signal with a phase shift of 180°. Since the phase of this signal leads that of the steering reaction force MT, the phase of the steering reaction force MT can be set more ahead the steering-wheel angle θ by adding a force according to this inverted lateral acceleration LA to the steering reaction force MT.

Figure 8:
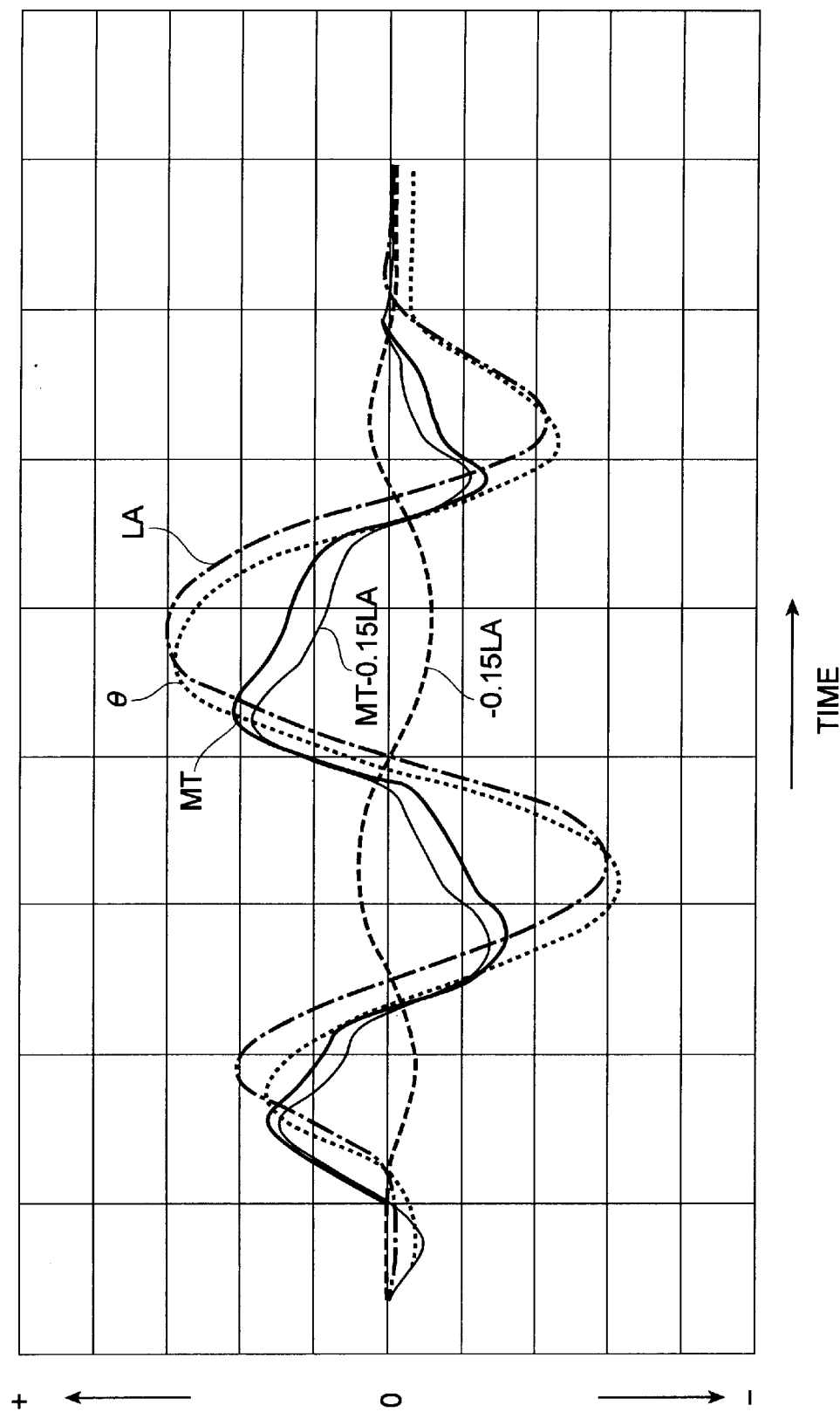
FIG. 8 is a diagram to show temporal transition curves of detection results etc.
Figure 9:
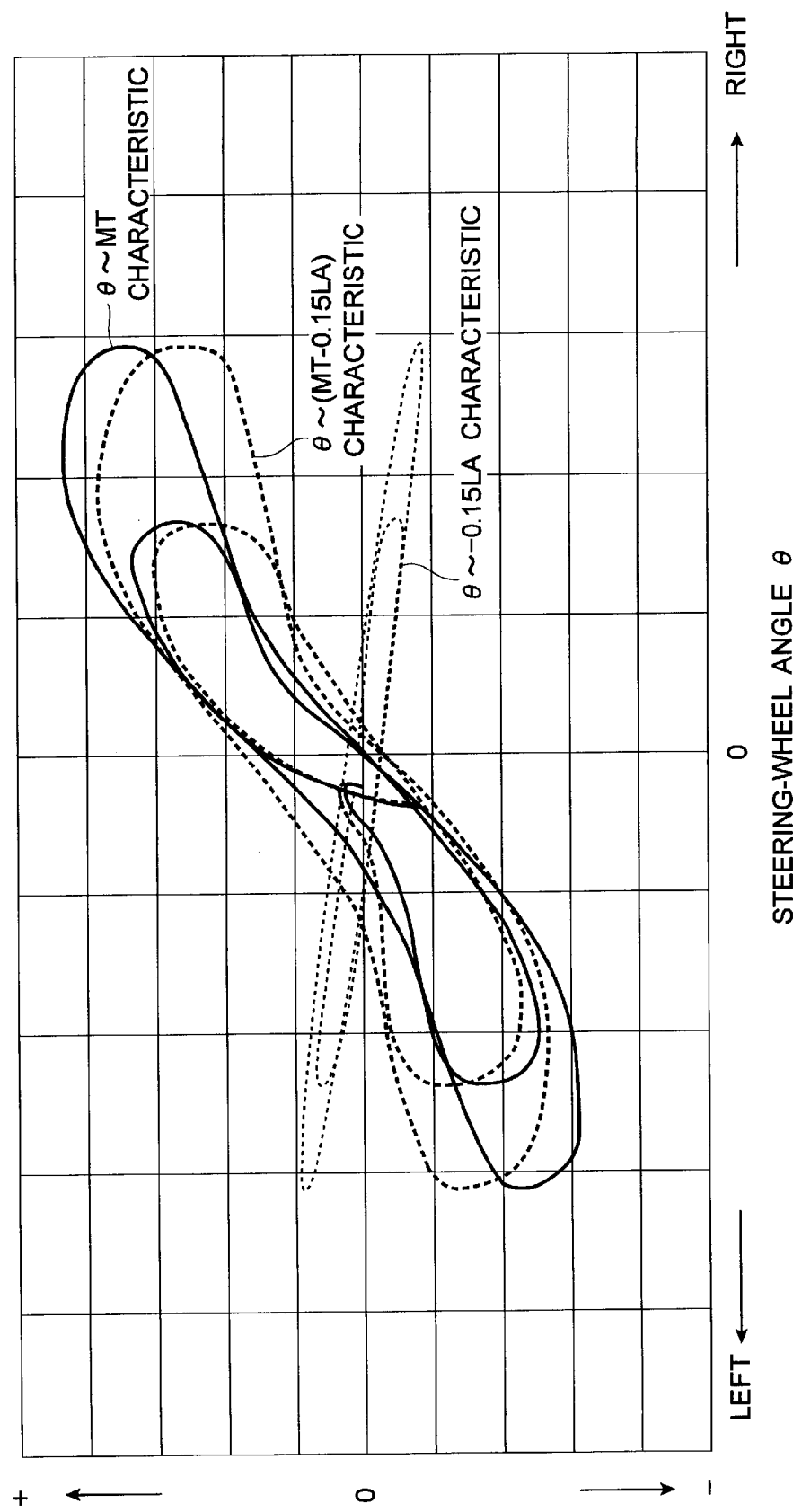
FIG. 9 is diagram of Lissajous loops to show phase differences between steering-wheel angle θ and each value.

Waveforms of respective detection results at high speed are illustrated in FIG. 8. A waveform indicated by −0.15LA is one obtained by inverting the signs of the detection result of the lateral acceleration LA and multiplying the inverted signal by 0.15. This waveform is added to the steering reaction force MT to obtain a waveform of Mt −0.15LA. It is seen that the phase of this waveform of MT −0.15LA leads that of the steering reaction force MT. FIG. 9 shows characteristics against steering-wheel angle θ in this case, in which the hysteresis width near the steering-wheel angle θ=0 is greater in the characteristic of θ versus (MT −0.15LA) than in the characteristic of θ versus MT. This verifies that the waveform of MT −0.15LA has the greater phase lead ahead the steering-wheel angle θ than that of the steering reaction force MT and that the decrease of the hysteresis width described previously can be restrained by adding the force according to the inverted lateral acceleration LA to the steering reaction force MT.

In this example the detected factor with the phase lag behind the steering-wheel angle θ was the lateral acceleration LA, but the phase of the steering reaction force MT can also be put forward by employing any detection result with a phase lag relative to the steering-wheel angle θ, for example, one factor selected from the yaw rate Yr, an axial force acting on the axle shaft 3, a load condition of the assist motor 5, etc., and adding a force according to a sign-inverted signal of the detection result of the selected factor to the steering reaction force MT similarly.

The first embodiment of the present invention will be described by reference to the accompanying drawings.

Figure 10:
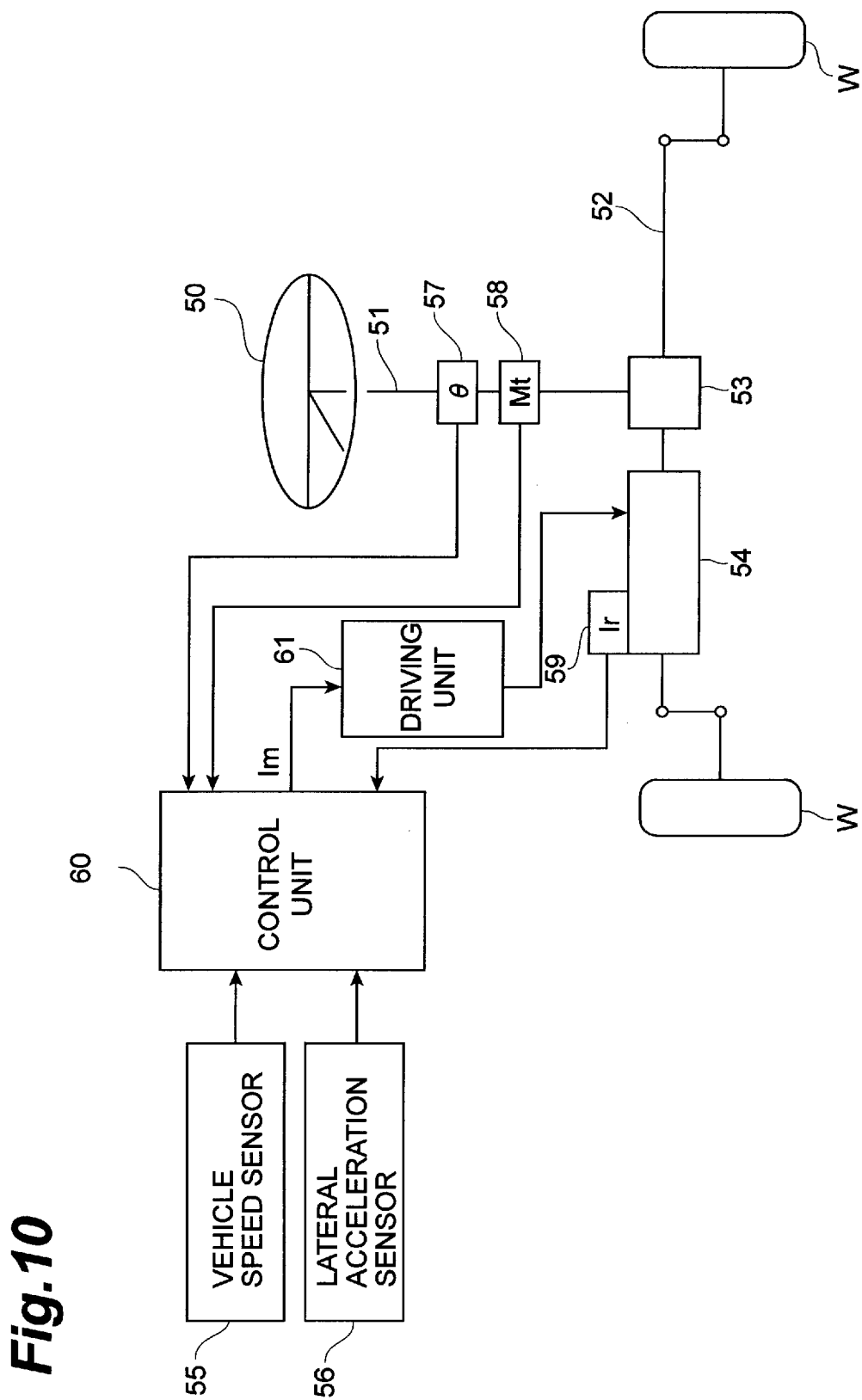
FIG. 10 is a diagram to schematically show the structure of a steering control apparatus.

FIG. 10 schematically shows an example of a steering control mechanism equipped with a power steering mechanism of the electric power assist type. The steering shaft 51 coupled to the steering wheel 50 is mechanically connected via gear box 53 to the axle shaft 52 coupled to the steered wheels W. The axle shaft 52 is provided with the assist motor 54 and the driving force of the assist motor 54 provides the assisting force for steering. A control unit 60 accepts detection results of a vehicle speed sensor 55, a lateral acceleration sensor 56, a steering-wheel angle sensor 57 for detecting the steering-wheel angle θ of the steering wheel 50, a torque sensor 58 for detecting the steering torque Mt, and a current sensor 59 for detecting a load current Ir feeded to the assist motor 54. The control unit 60 sets a target current value Ips for driving the assist motor 54, based on these detection results, and a driving unit 61 controls a driving current so as to supply the target current value Ips to the assist motor 54.

The processing carried out in the control unit 60 will be described along the flowchart of FIG. 11. In the step S102, the vehicle speed V, the steering-wheel angle θ, the lateral acceleration LA, the load current value Ir, and the steering torque Mt are detected by the respective sensors. In next S104, a total steering load acting on the steering wheel 50 is computed according to Eq. (2) below and the result of the computation is set as a total load (total steering load) Mtt. In Eq. (2) "Kps" is a positive coefficient which indicates the effect of the load current value Ir flowing in the assist motor 54 on the steering torque Mt.

$$Mtt = Kps \cdot Ir + Mt \tag{2}$$

Figure 12:
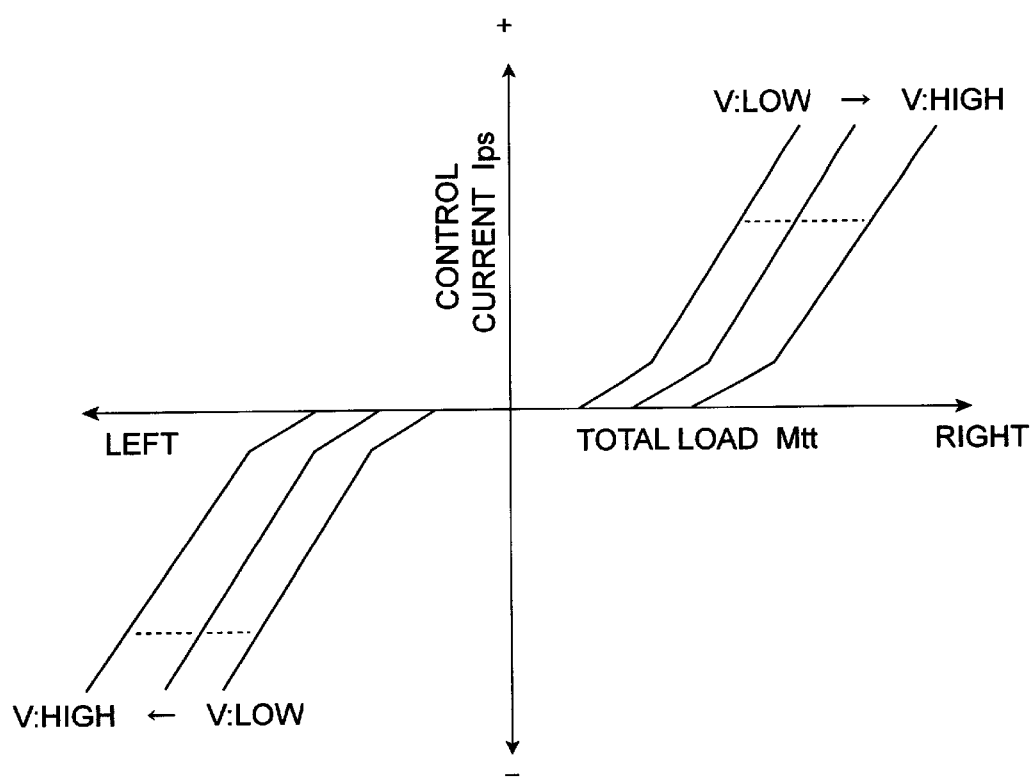
FIG. 12 is a map to specify the relation of control current Ips against total load Mtt and vehicle speed V.

In next S106, a control current value Ips for the assist motor 54 is set, based on the total load Mtt and the vehicle speed V. In this case, for example as illustrated in FIG. 12, the relation of control current Ips against total load Mtt and vehicle speed V is preliminarily prepared in the form of a map and the map is searched according to the total load Mtt and the vehicle speed V to set a corresponding control current value Ips. A force produced by the assist motor 54 corresponding to the control current value Ips is the assisting force for steering.

In next S108, a target current value Im is set as a target control amount for the assist motor 54 according to Eq. (3) below, using the lateral acceleration LA read in S102 in addition to the control current value Ips in order to adjust the phase of the steering reaction force MT.

$$Im = Kla \cdot LA + Ips \tag{3}$$

In Eq. (3) the first term in the right side is a control amount for phase control. And the second term in the right side is a control amount for control of assisting force. In Eq. (3) "Kla" is a positive coefficient which indicates the effect of the lateral acceleration LA on the steering torque MT. In the phase control example illustrated in FIG. 8 etc. the sign-inverted signal of the detection result of the lateral acceleration LA is added to the steering reaction force MT, which is an operation of adding the force so as to reduce the steering reaction force MT. Since the control amount set herein is the control amount of the assist motor 54 adapted for reducing the steering reaction force MT, the term of lateral acceleration LA is a positive value. Namely, Kla and LA both are positive values and the assist amount by the assist motor 54 is increased (or the steering reaction force MT is decreased) by the degree of the first term in the right side of Eq. (3).

In next S110 the target current value Im set in S108 is outputted to the driving unit 61 and the driving unit 61 controls the driving current so as to supply the target current value Im to the assist motor 54.

In the case of the steering system making use of the assist motor 54 in the electric power steering mechanism, the phase of the steering reaction force MT with respect to the steering-wheel angle θ can also be advanced according to the lateral acceleration LA by the control amount set by the first term of the right side in Eq. (3). And the effect thereby is as illustrated in aforementioned FIG. 8 and FIG. 9.

In this embodiment the driving force of the actuator (assist motor 54) is made to act along the movable direction of the steering system (the movable direction of the axle shaft 52). The steering reaction force is composed of the reaction force based on the external force acting on the steering system from the steered wheels and the reaction force based on the frictional force of the steering system. And the resultant force of these reaction forces acts as the steering reaction force on the steering wheel. When the driving force of the actuator is made to act along the movable direction of the steering system, this driving force is combined with the external force acting from the wheels on the steering system, so that the phase of the external force acting from the steered wheels on the steering system can be put forward or backward. The phase of the steering reaction force acting on the steering wheel is thus controlled by changing the phase of the external force as a component of the steering reaction force.

Further, in this embodiment, the control amount for the actuator is set so as to put the phase of the steering reaction force against the steering-wheel angle forward. By putting the phase of the steering reaction force against the steering-wheel angle forward, the control can be made so as to increase the hysteresis width of the steering-wheel angle versus steering reaction force characteristic, particularly, near the neutral position of steering-wheel angle.

As described above, the phase control means can also set the control amount for the actuator so as to put the phase of the steering reaction force against the steering-wheel angle backward. By putting the phase of the steering reaction force against the steering-wheel angle backward, the control can also be made so as to decrease the hysteresis width.

The second embodiment will be described next.

As described previously, the decrease of the hysteresis width of the steering-wheel angle θ versus steering reaction force MT characteristic at high speed is restrained by setting the target current value Im based on Eq. (3) in S108 of FIG. 11. To restrain the decrease of the hysteresis width at high speed means to eliminate the factor of decreasing the hysteresis width at high speed and this also acts so as to cancel the increase of the steering reaction force MT with increasing vehicle speed V, at the same time. Namely, advancing the phase of the steering reaction force MT against steering-wheel angle θ results in gentling the inclination of the Lissajous loop of the steering-wheel angle θ versus steering reaction force MT characteristic, so that the smaller steering reaction force acts on the steering wheel 50 than expected to act actually.

Since the first term in the right side of Eq. (3) acts so as to cancel the increase of the tire reaction force Tsat with increasing vehicle velocity V as described above, there is a possibility that the feeling of the increase of the steering reaction force MT with increasing vehicle velocity V is canceled. Taking this point into consideration, the present embodiment adopts Eq. (4) below instead of Eq. (3) in S108. With Eq. (4), the target current value Im is set by further adding a control amount (corrected control amount) Ima which increases the steering reaction force MT with increasing vehicle velocity V, to the right side of Eq. (3). Since the control amount Ima is added so as to increase the steering reaction force MT, the sign thereof is "negative."

$$Im = Kla \cdot LA - Ima + Ips \tag{4}$$

Figure 13:
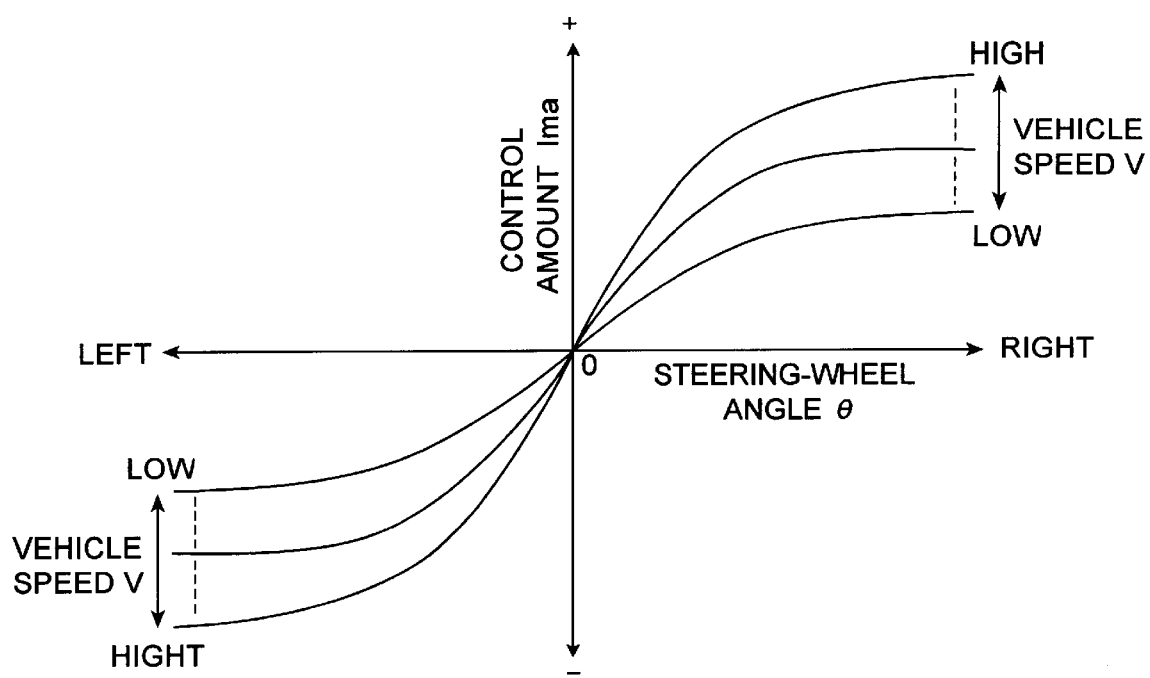
FIG. 13 is a map to specify the relation of control amount Ima against steering-wheel angle θ and vehicle speed V.

This control amount Ima is set according to the steering-wheel angle θ and the vehicle speed V, for example, based on the map illustrated in FIG. 13. In this case, a vehicle state quantity varying similarly with the steering-wheel angle θ can also be used instead of the steering-wheel angle θ. Such a vehicle state quantity is, for example, a stroke position of the axle shaft 52 mechanically coupled to the steering wheel 50 or a road-wheel angle of the steered wheels W.

The first and second embodiments described above employed the lateral acceleration LA as an example of the detection result corresponding to the magnitude of the external force acting from the wheels W to the steering system, but, in addition thereto, the axial force Fr acting on the axle shaft 52 and the load current value Ir of the assist motor 54 also demonstrate characteristics similar to that of the external force (tire reaction force Tsat) acting from the steered wheels W on the steering system. Therefore, detection results of these factors can replace the lateral acceleration LA and Eq. (3) can be rewritten into Eq. (5) or Eq. (6) below, using positive coefficients of Kfr and Kir.

$$Im = Kfr \cdot Fr + Ips \tag{5}$$

$$Im = Kir \cdot Ir + Ips \tag{6}$$

Further, the lateral acceleration LA is proportional to Yr·V, where Yr is the yaw rate acting on the vehicle and V is the vehicle speed. Thus the first term in the right side of Eq. (3) can be expressed as Kla·LA=Kyr·Yr·V where Kyr is a positive coefficient. Therefore, Eq. (3) can be rewritten into Eq. (7) below.

$$Im = Kyr \cdot Yr \cdot V + Ips \tag{7}$$

The external force acting from the steered wheels W on the steering system can also be grasped based on a mechanical displacement position X according to steering by the steering wheel 50, the vehicle speed V at that time, and a coefficient of friction $\mu$ of road surface, for example. Therefore, the control amount determined by the first term in the right side of Eq. (3) etc. can also be set as a function f (X, V, $\mu$) having variables of these mechanical displacement position X, vehicle speed V, and friction coefficient $\mu$ of road surface. The mechanical displacement position X can be represented by the stroke position of the axle shaft 52, the road-wheel angle of the steered wheels W, or the like, and these are obtained as detection signals with a phase lag behind the steering-wheel angle $\theta$. A detected value of steering-wheel angle $\theta$ itself cannot be used as a signal for advancing the phase of the steering reaction force MT, but the steering-wheel angle $\theta$ can also be used in setting the control amount set at the first term in the right side of Eq. (3) etc., by changing the phase of the detection result thereof or by combining it with another detection result as described hereinafter.

Further, the target current value Im can also be set by further adding to Eq. (3) a differential term (first derivative) and a quadratic differential term (second derivative), which indicate changing states of the lateral acceleration LA, as expressed by Eq. (8) below. In Eq. (8) Kla1 and Kla2 are positive coefficients.

$$Im=Kla \cdot LA - Kla1 \cdot dLA/dt - Kla2 \cdot d^2LA/dt^2 + Ips \qquad (8)$$

Figure 14:
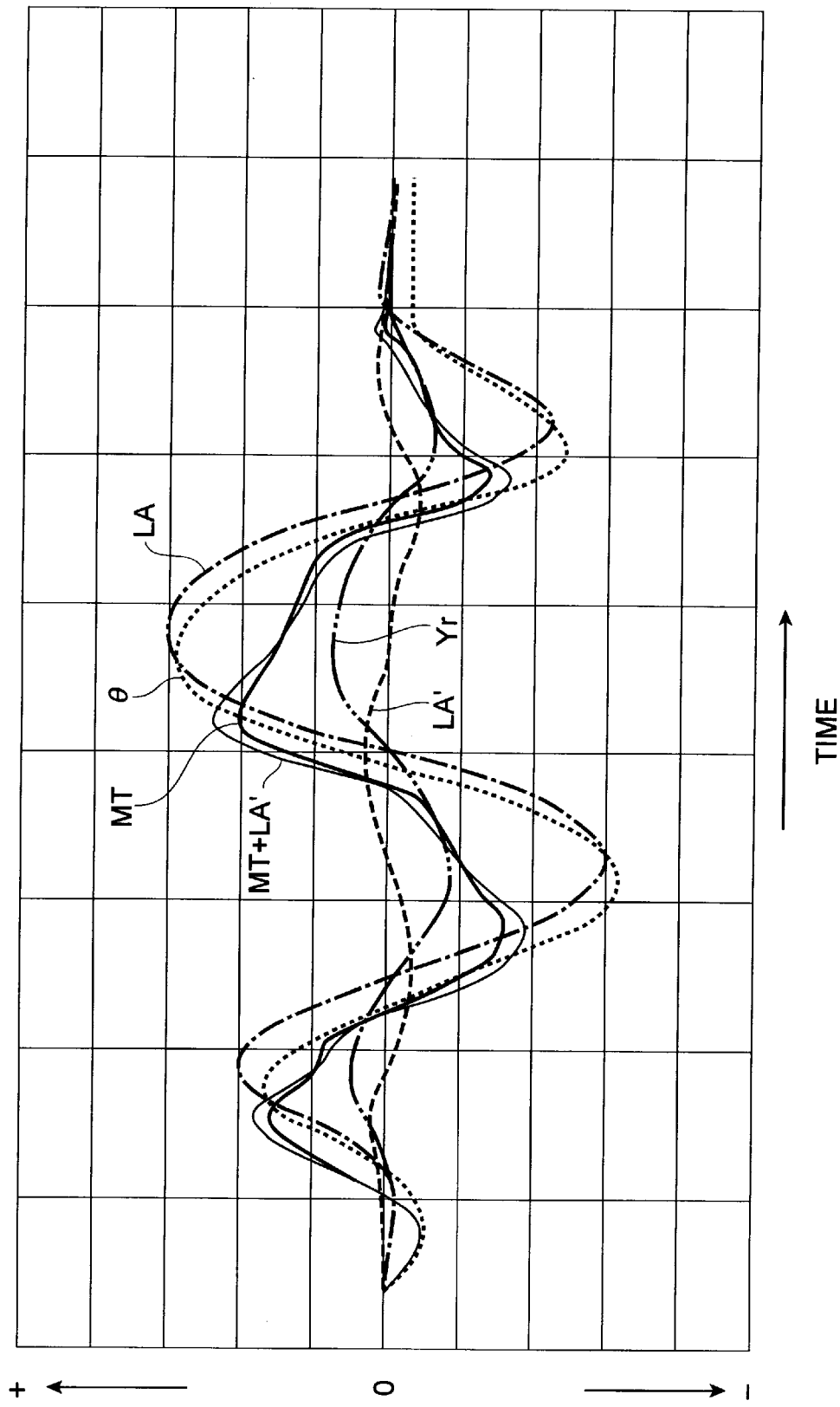
FIG. 14 is a diagram to show temporal transition curves of detection results etc.
Figure 15:
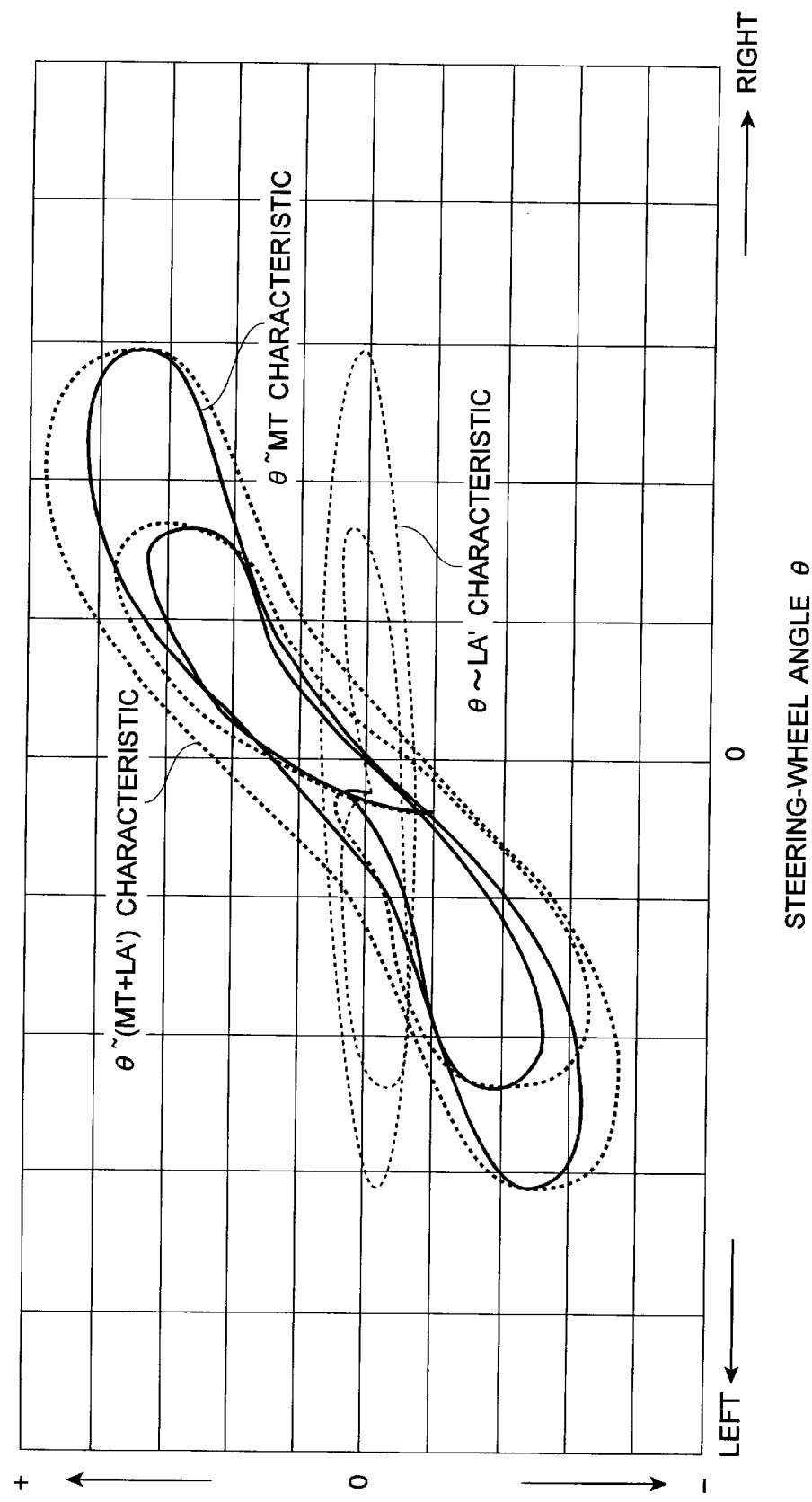
FIG. 15 is a diagram of Lissajous loops to show phase differences between steering-wheel angle θ and each value.

In FIG. 14 a waveform indicated by LA' is a waveform obtained by differentiating the detected signal of the lateral acceleration LA and multiplying the result by 5. The phase of this waveform LA' leads that of the steering reaction force MT. Therefore, a waveform MT+LA' resulting from addition of the waveform LA' to the steering reaction force MT becomes a waveform with a phase lead ahead the steering reaction force MT. Characteristics against steering-wheel angle $\theta$ in this case are illustrated in FIG. 15 and it is seen that the hysteresis width near the steering-wheel angle $\theta$=0 is larger in the characteristic of $\theta$ versus (MT+LA') than in the $\theta$ versus MT characteristic. This also verifies that the waveform of MT+LA' has the greater phase lead against the steering-wheel angle $\theta$ than the steering reaction force MT and that the decrease of the hysteresis width described previously can be restrained by making a force according to the differential term of the lateral acceleration LA act so as to increase the steering reaction force MT.

Since this differential term of lateral acceleration LA is added so as to increase the steering reaction force MT, the sign of the second term in the right side is "negative" in Eq. (8) for setting the assisting force. Since the addition of this second term in the right side acts to increase the hysteresis width of the $\theta$ versus MT characteristic in the region of small steering angles $|\theta|$, it can increase the reaction force sensed at the start of turning the steering wheel 50. The third term in the right side of Eq. (8) acts so as to increase the hysteresis width of the $\theta$ versus MT characteristic in the region of small steering-wheel angles $|\theta|$ and even in a steering state of low steering speed as long as the condition of steering acceleration$\neq$0 is met, and thus it can prevent fluctuations of the steering wheel 50.

With Eq. (8), the lateral acceleration LA was described as an example of the differentiated detection signal, but, in addition to the lateral acceleration LA, the axial force Fr acting on the axle shaft 52 and the load current value Ir of the assist motor 54 can also be applied as detection results indicating characteristics similar to that of the external force (tire reaction force Tsat) acting from the steered wheels W on the steering system.

Further, the detection result indicating the mechanical displacement position according to steering by the steering wheel 50 can also replace the lateral acceleration LA and in this case, for example, a detection signal of the steering-wheel angle $\theta$, the stroke position of the axle shaft 52, or the road-wheel angle of the steered wheels W is adopted for the differential terms.

The steering-wheel angle $\theta$ can also be used for the differential terms as described above. This is for the following reason. For example, supposing the steering-wheel angle is defined as $\theta=\sin(\omega t)$, differentiation of this detection result produces $\omega\cos(\omega t)$ and thus we can expect the effect of a forward phase shift by 90° of the detection signal of the steering-wheel angle $\theta$.

Figure 16:
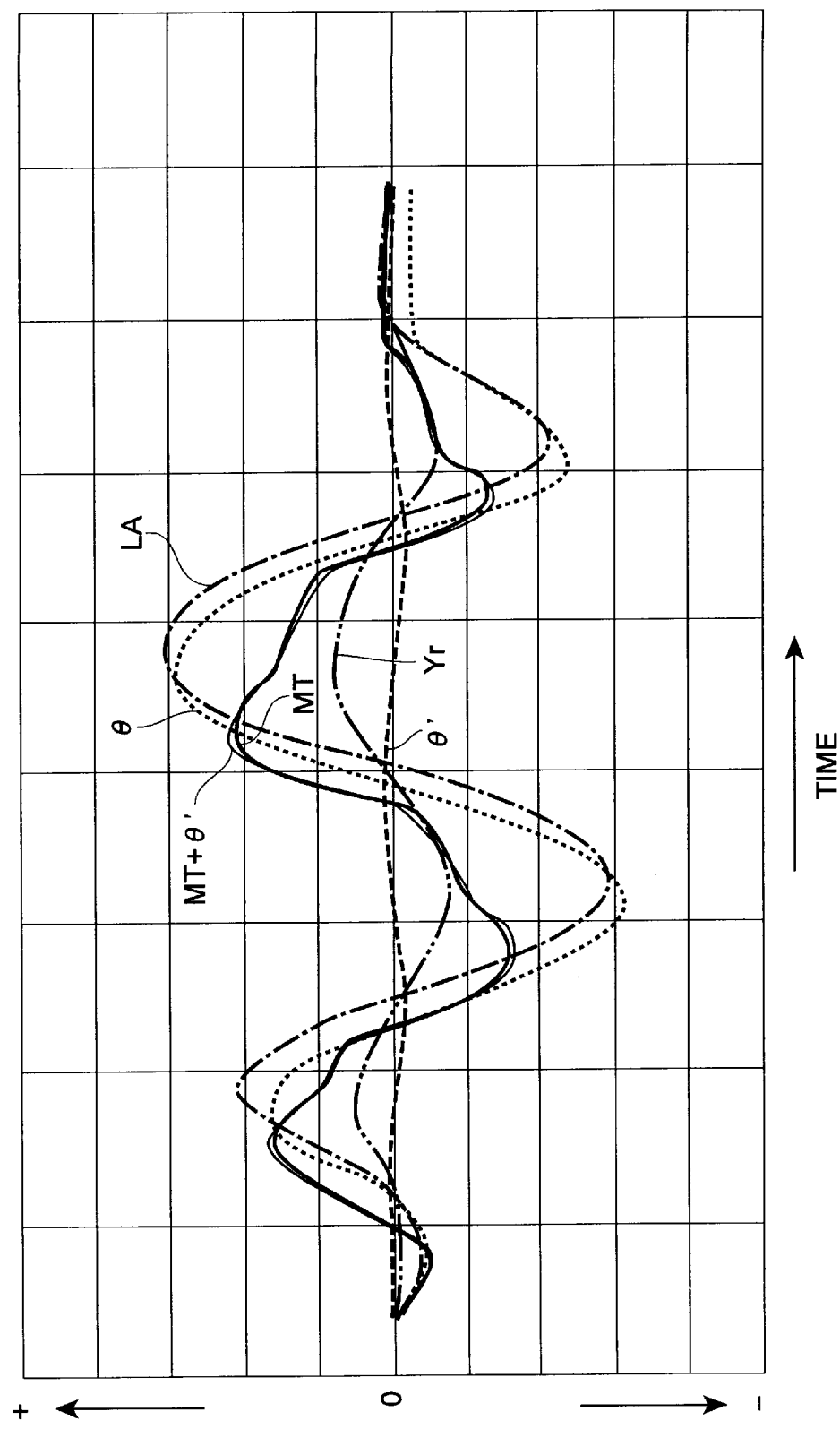
FIG. 16 is a diagram to show temporal transition curves of detection results etc.
Figure 17:
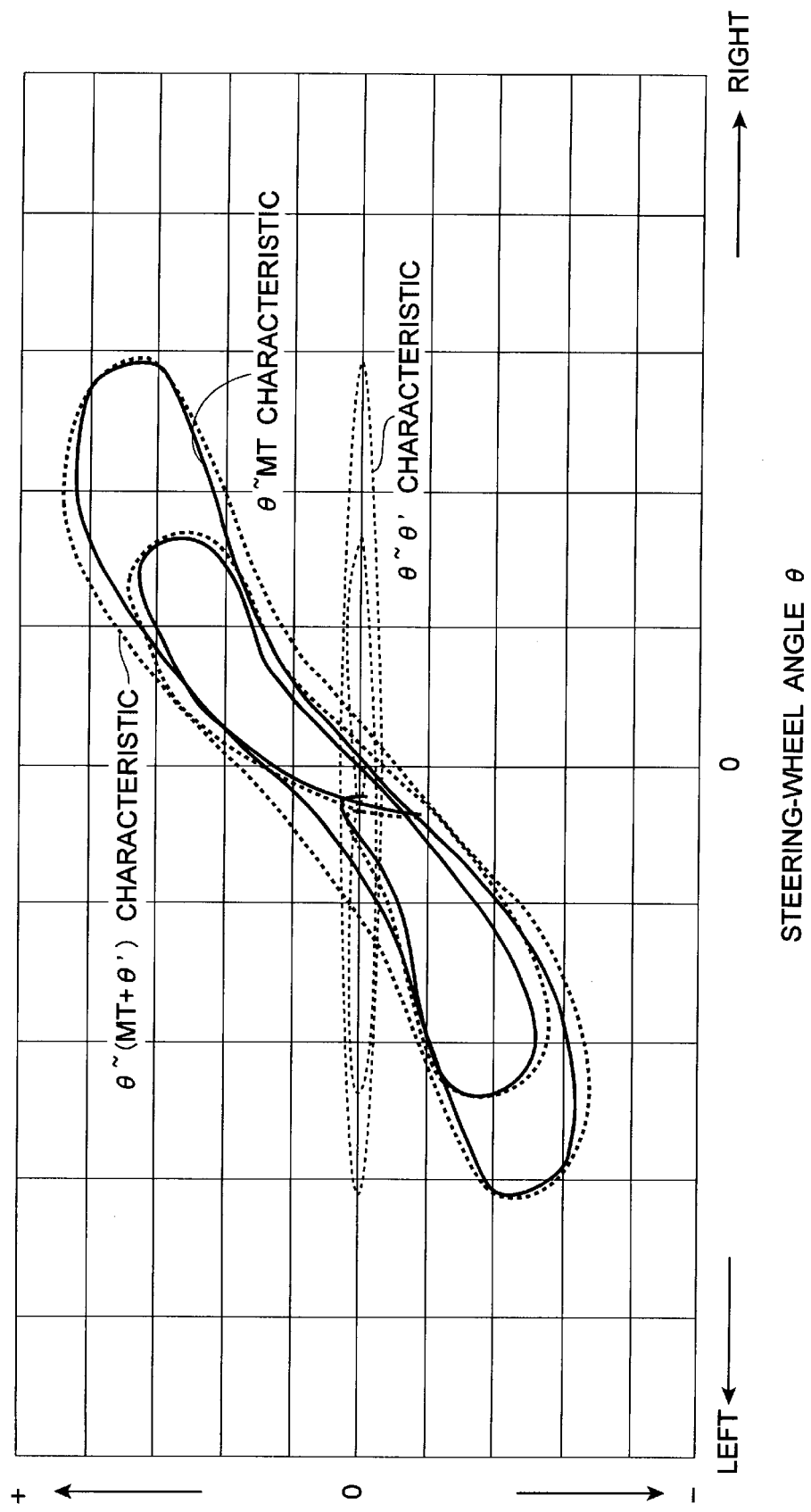
FIG. 17 is a diagram of Lissajous loops to show phase differences between steering-wheel angle θ and each value.

FIG. 16 shows a waveform of $\theta'$ obtained by differentiating the detection signal of the steering-wheel angle $\theta$ and multiplying the result by 0.2. The phase of this waveform $\theta'$ leads that of the steering-wheel angle $\theta$ and a waveform MT+$\theta'$ is one with a phase lead ahead the waveform MT. Characteristics against steering-wheel angle $\theta$ in this case are illustrated in FIG. 17 and the hysteresis width near the steering-wheel angle $\theta$=0 is greater in the characteristic of $\theta$ versus (MT+$\theta'$) than in the $\theta$ versus MT characteristic. This also verifies that the waveform of MT+$\theta'$ has the greater phase lead against the steering-wheel angle $\theta$ than the steering reaction force MT and that the decrease of the hysteresis width described previously can be restrained by making a force according to the differential term of the steering-wheel angle $\theta$ act so as to increase the steering reaction force MT.

When the detection result of the steering-wheel angle $\theta$ is adopted for the differential term (first derivative) and the quadratic differential term (second derivative) in Eq. (8), Eq. (8) is written into Eq. (9) below. In Eq. (9) Kma1 and Kma2 are positive coefficients.

$$Im=Kla \cdot LA - Kma1 \cdot d\theta/dt - Kma2 \cdot d^2\theta/dt^2 + Ips \qquad (9)$$

By employing the following technique, the phase lead angle or the phase lag angle of the detection signal can be set arbitrarily. Described herein is an example of the steering-wheel angle $\theta$ where the phase of the detection signal $\theta=\sin(\omega t)$ is changed to produce $\sin((\omega t+\alpha))$.

First, $\sin(\omega t+\alpha)$ can be expanded as expressed by Eq. (10) below, using the trigonometric identity.

$$\sin(\omega t+\alpha)=\sin(\omega t)\cdot\cos\alpha+\cos(\omega t)\cdot\sin\alpha \qquad (10)$$

Putting $\sin(\omega t)=\theta$ into Eq. (10) and using $d\theta/dt=\omega\cos(\omega t)$, Eq. (10) can be rewritten into Eq. (11) below.

$$\sin(\omega t+\alpha)=\theta\cdot\cos\alpha+(1/\omega)\cdot(\sin\alpha)\cdot(d\theta/dt) \qquad (11)$$

By setting "$\alpha$" as a phase lead angle arbitrarily, a phase lead signal according to "$\alpha$" can be generated by Eq. (11), based on the steering-wheel angle $\theta$ as a detection result and its differential. When the detection signal described above is differentiated or reversed, the phase of the detection signal is put forward by 90° or by 180°, respectively, and the degree of the phase lead can be set freely by properly setting "$\alpha$" in Eq. (11). For implementing different steering feeling between sports type cars and sedans in system design for example, "$\alpha$" as a phase lead angle is changed so as to obtain the hysteresis width suitable for the expected steering feeling, which facilitates the system design.

It is also possible to set the value of "$\alpha$" as a phase lead angle according to the vehicle speed, the friction coefficient of road surface, vehicle weight, and so on and this permits a suitable value of "α" to be set according to change in the vehicle speed etc. For example, replacing the first term in the right side of Eq. (3) with the right side of Eq. (11) and employing a positive coefficient of Kα, Im can be expressed by the following equation.

$$Im=K\alpha \cdot (\theta \cdot \cos\alpha + (1/\omega) \cdot (\sin\alpha) \cdot (d\theta/dt)) + Ips$$

By setting values of "α" in the above equation according to the vehicle velocity V so as to gradually increase with increase in the vehicle velocity V, the phase control can be implemented so that the phase of the steering reaction force MT against the steering-wheel angle θ is put forward with increasing the vehicle velocity V. Execution of this phase control can restrain the tendency in which the degree of the phase lead of the steering reaction force MT against the steering-wheel angle θ becomes smaller with increase in the vehicle speed V, whereby the decrease of the hysteresis width at high speed as described with FIG. 1 or FIG. 5 previously can be restrained.

Further, where in setting the target current value Im the phase of the steering-wheel angle θ is put forward by use of its differential term as in Eq. (9), the steering reaction force is decreased by that degree when motion of the steering wheel 50 stops. In such cases, the change of the steering torque between before and after the stop of steering can be restrained by using Eq. (11) in place of the differential term of Eq. (9), because use of Eq. (11) produces a control amount based on the proportional term concerning the steering-wheel angle θ (the first term in the right side of Eq. (11).

When the sign of the second term in the right side in Eq. (11) is "negative," the left side of the same equation becomes $\sin(\omega t-\alpha)$ and, therefore, it is also possible to set "α" as a phase lag angle. Eq. (11) was the example of the steering-wheel angle θ, but the same technique can also be applied to the other detection results such as the lateral acceleration LA, the yaw rate Yr, a roll rate, etc. in order to change the phase of the detection signal.

In this way the phase control means may set the control amount based on the detection result directly or indirectly indicating the external force acting from the steered wheels on the steering system. As described previously, the external force acting from the steered wheels on the steering system is involved in generation of the steering reaction force and the hysteresis width in the steering-wheel angle versus steering reaction force characteristic varies with change in the phase of the external force against the steering-wheel angle. Thus the phase control of the steering reaction force according to the change of external force is implemented by detecting transition of this external force and making the control of the actuator reflect this detection result. The external force acting from the steered wheels on the steering system can be detected directly based on the lateral acceleration acting on the vehicle, the axial force acting on the axle shaft coupled to the wheels, the load on the motor for driving the axle shaft, or the like, and it can also be detected indirectly based on the yaw rate acting on the vehicle, and the vehicle speed, for example.

As described, the phase control means may set the control amount based on the detection result which indicates the mechanical displacement according to manipulation of the steering wheel. This permits the external force acting from the steered wheels on the steering system to be captured readily even in cases wherein the detection result such as the steering-wheel angle of the steering wheel, the road-wheel angle of the steered wheels, the displacement position of the axle shaft, or the like is used as the mechanical displacement-according to the manipulation of the steering wheel. On this occasion, consideration may also be given to the vehicle speed, the friction coefficient of road surface (hereinafter referred to as μ of road surface), and so on. When the phase control means uses the detection result of steering-wheel angle, the control amount capable of changing the phase of the steering reaction force against steering-wheel angle can be set by using it in combination with the detection result different in the phase from the steering-wheel angle, for example.

Further, the phase control means may set the control amount, based on the changing state of the detection result, as described above. This can realize the hysteresis width according to the changing state by taking account of the changing state such as the change rate of the detection result or the like in setting the control amount. This can also increase the hysteresis width, for example, in reversing the turn of the steering wheel, which can improve steering reaction feeling and in turn improve the-operability.

Moreover, as described above, the phase control means may set the corrected control amount for the actuator, based on the mechanical displacement according to the manipulation of the steering wheel, so as to suppress the change of the steering reaction force caused by the phase shift. For example, assuming that the decrease of the hysteresis width at high speed is restrained by advancing the phase of the steering reaction force, the advance of the phase of the steering reaction force will result in gentling the inclination of the Lissajous loop of the steering-wheel angle versus steering reaction force characteristic and thus making the steering reaction force smaller than expected to act actually. In this case, therefore, the corrected control amount is set so as to increase the steering reaction force in accordance with the steering-wheel angle indicating the steering position of the steering wheel in order to restrain the decrease of the steering reaction force caused by the phase shift. If the phase is controlled so as to put the phase of the steering reaction force backward, this control will result in increasing the inclination of the Lissajous loop of the steering-wheel angle versus steering reaction force characteristic and the steering reaction force acting will become greater than expected to act actually. In this case, therefore, the corrected control amount is set so as to decrease the steering reaction force in accordance with the steering-wheel angle indicating the steering position of the steering wheel in order to restrain the increase of the steering reaction force caused by the phase shift.

Further, the phase control means herein further changes the corrected control amount described above in accordance with the vehicle speed, whereby the steering reaction force according to the mechanical displacement such as the steering-wheel angle or the like varies according to the vehicle speed. For this reason, a more suitable corrected control amount can be set by further changing the corrected control amount in accordance with the vehicle speed.

As described above, the phase control means herein changes the phase of the signal indicating the detection result and sets the control amount, based on the detection result with the phase shift. The phase lead or lag angle of the steering reaction force against the steering-wheel angle can be selected freely by properly changing the phase of the detection result as described.

The third embodiment will be described next.

Excluding the assisting force for steering, the steering reaction force MT is composed of the frictional force Tm of the steering system and the tire reaction force Tsat. And this frictional force Tm acts to make the phase of the steering reaction force MT lead that of the steering-wheel angle θ (see FIG. 3 to FIG. 5). As described previously, the higher the vehicle speed, the greater the phase lag of the tire reaction force Tsat behind the steering-wheel angle θ; this results in decreasing the phase lead of the steering reaction force MT ahead the steering-wheel angle θ and decreasing the hysteresis width in the steering-wheel angle θ versus steering reaction force Mt characteristic. A large hysteresis width can be left up to the high speed by preliminarily exerting a large mechanical frictional force Tm on the steering system.

However, the following disadvantages will occur at low speed when the large frictional force Tm is exerted.

First, the frictional force Tm makes the wheel manipulation heavy and imposes a great load on the driver, particularly, under circumstances of driving at low speed where a varying range of steering-wheel angle θ by the wheel manipulation is wide.

Figure 18:
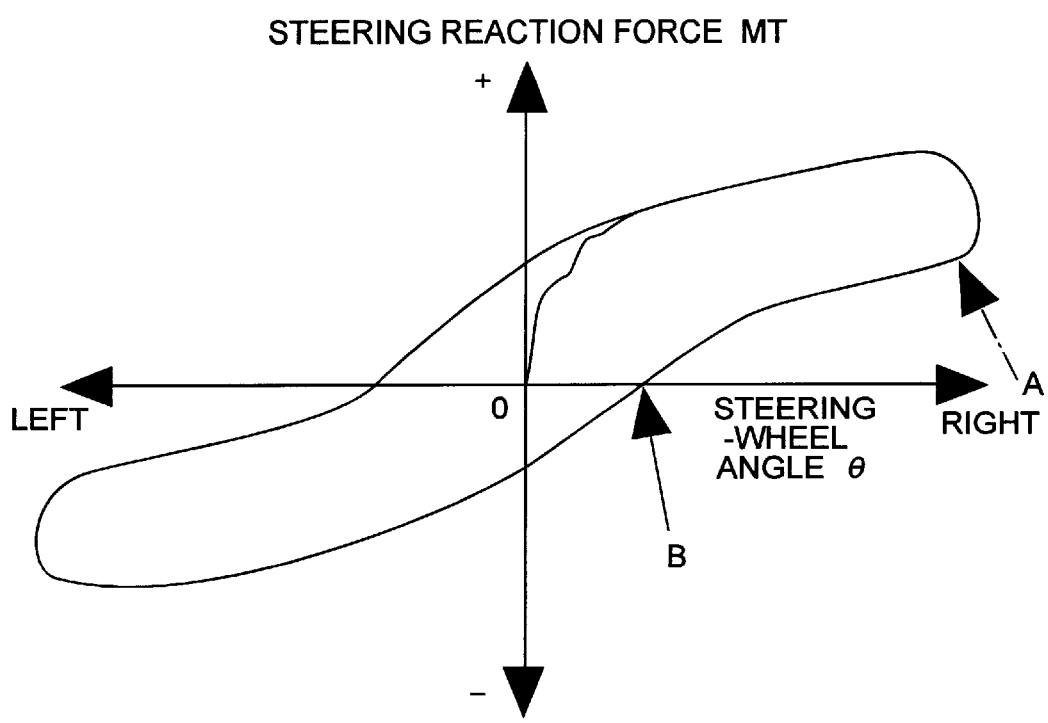
FIG. 18 is a diagram of a Lissajous loop to show the phase difference between steering-wheel angle θ and steering reaction force MT.

As illustrated in FIG. 18, the greater the frictional force Tm of the steering system, the smaller the steering reaction force MT in reversing the turn of the steering wheel, indicated by an arrow A; when the driver carries out such an operation as to return the steering wheel while loosening hold by making use of the steering reaction force MT, the frictional force affects the operation to decrease the reversing rate of the steering wheel, so as to make it worse to return the orientation of the vehicle.

Further, in such cases that the steering wheel is returned with loosening hold, rotation of the steering wheel stops at the steering-wheel angle where the steering reaction force MT becomes equal to 0 as indicated by an arrow B and the driver needs to exert a further steering force in the reversing direction in order to return the vehicle into a straight-ahead state. This tendency becomes more prominent as the vehicle speed becomes lower.

When a reasonable level of the frictional force Tm is thus exerted on the steering system, the hysteresis width can be smaller at lower vehicle speed but larger at higher vehicle speed in the steering-wheel angle θ versus steering reaction force MT characteristic; this can achieve both the operability in the low vehicle speed range and the stability in the high vehicle speed range together.

Figure 19:
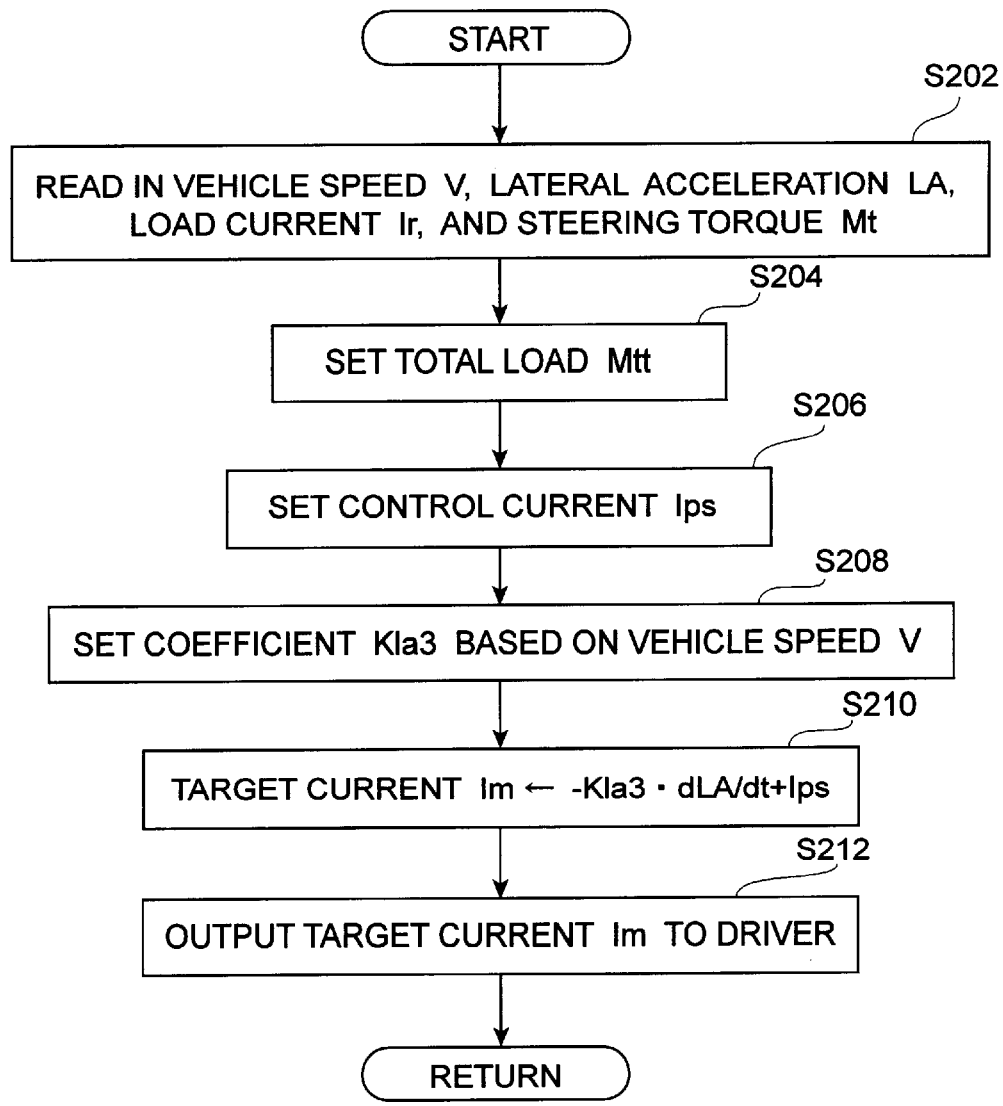
FIG. 19 is a flowchart to show the control process of the driving unit according to another embodiment.

An example of such control as to increase or decrease the hysteresis width as described above will be described along the flowchart of FIG. 19. The steering control mechanism is similar to FIG. 10 stated previously.

Figure 11:
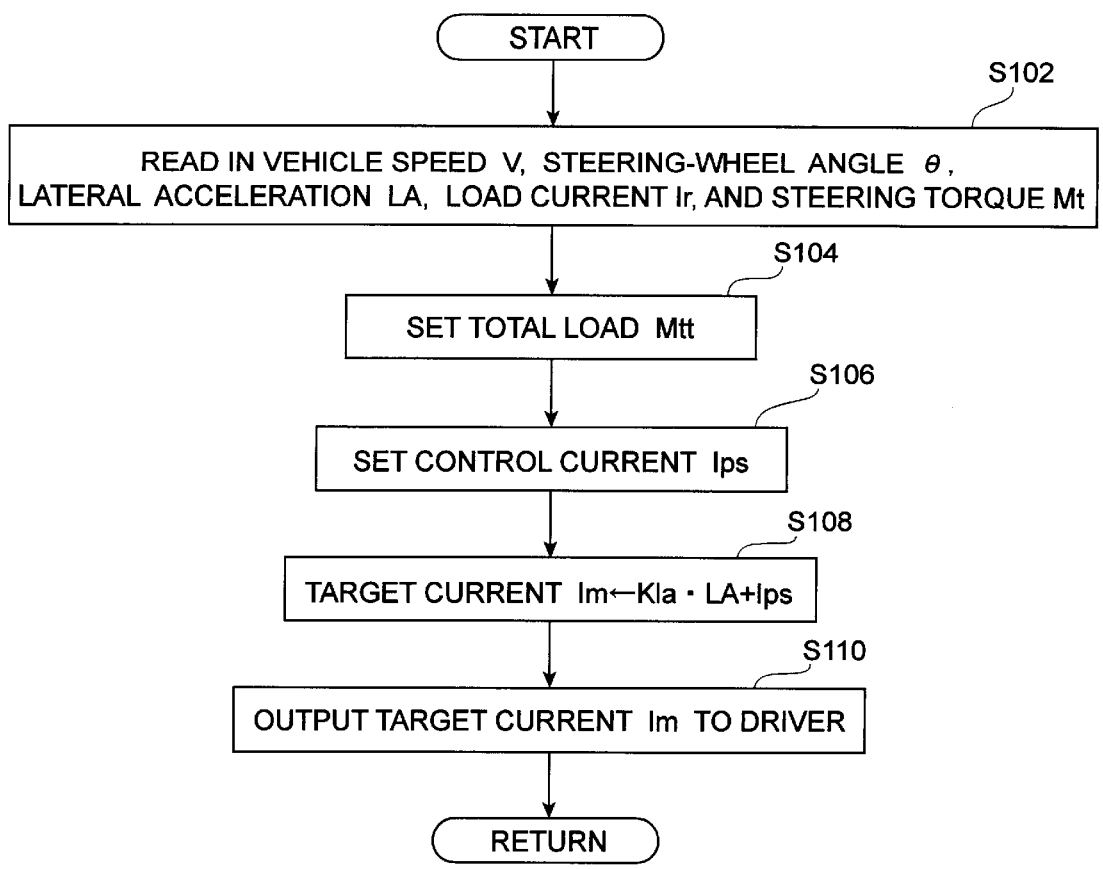
FIG. 11 is a flowchart to show a control process of a driving unit.

The steps S202 to S206 are carried out in a similar fashion to S102 to S106 described with FIG. 11 and thereafter goes to S208.

Figure 20:
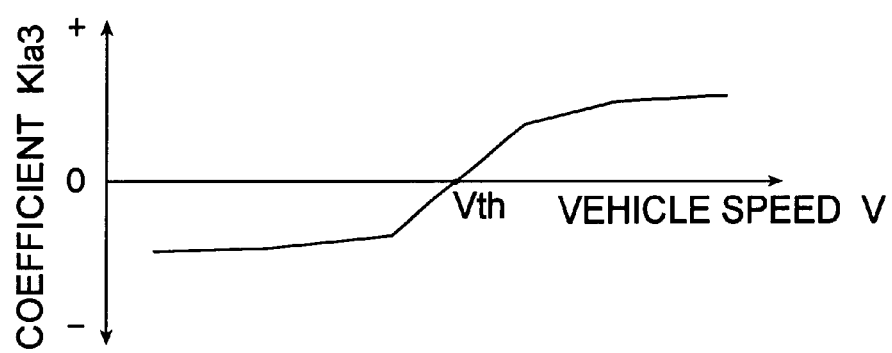
FIG. 20 is a map to specify the relation between vehicle speed V and coefficient Kla.

In S208 a coefficient Kla3 is set based on the vehicle speed V read in S202. In this case, for example as illustrated in FIG. 20, the relation between the vehicle speed V and the coefficient Kla3 is preliminarily prepared in the form of a map. The map is searched according to the vehicle speed V to set a corresponding coefficient Kla3. This results in setting the coefficient Kla3 to a negative value whose absolute value becomes larger as the vehicle speed becomes lower, or to a positive value whose absolute value becomes larger as the vehicle speed becomes higher, on either side of a threshold Vth of the vehicle speed V.

In next S210 the target current value Im for the assist motor 54 is set according to Eq. (12) below, using the lateral acceleration LA read in S202, the control current value Ips set in S206, and the coefficient Kla3 set in S208.

$$Im = -Kla3 \cdot dLA/dt + Ips \quad (12)$$

In next S212 the target current value Im set in S210 is outputted to the driving unit 61 and the driving unit 61 controls the driving current so as to supply the target current value Im to the assist motor 54.

In this way the target current value Im is set so that in the high speed range over the threshold Vth the degree of the phase lead of the steering reaction force MT against the steering-wheel angle θ increases with increase in the vehicle speed V and so that in the low speed range below the threshold Vth the degree of the phase lead of the steering reaction force MT against the steering-wheel angle θ decreases with decrease in the vehicle speed V. Therefore, in the high speed range, the hysteresis width in the steering-wheel angle θ versus steering reaction force MT characteristic increases with increase in the vehicle speed V, whereby the steering stability can be enhanced at high speed. In the low speed range the hysteresis width decreases with decrease in the vehicle speed V, whereby the steering force can be decreased and the operability of reversing the turn of the steering wheel can be improved.

As described in the preceding embodiment, it is preferable on this occasion to set the target current value Im for the assist motor 54 according to Eq. (13) below in previous S210, taking account of the control amount (corrected control amount) Ima for adjusting the magnitude of the steering reaction force MT varying with the phase control.

$$Im = -Kla3 \cdot dLA/dt - Ima + Ips \quad (13)$$

Figure 21:
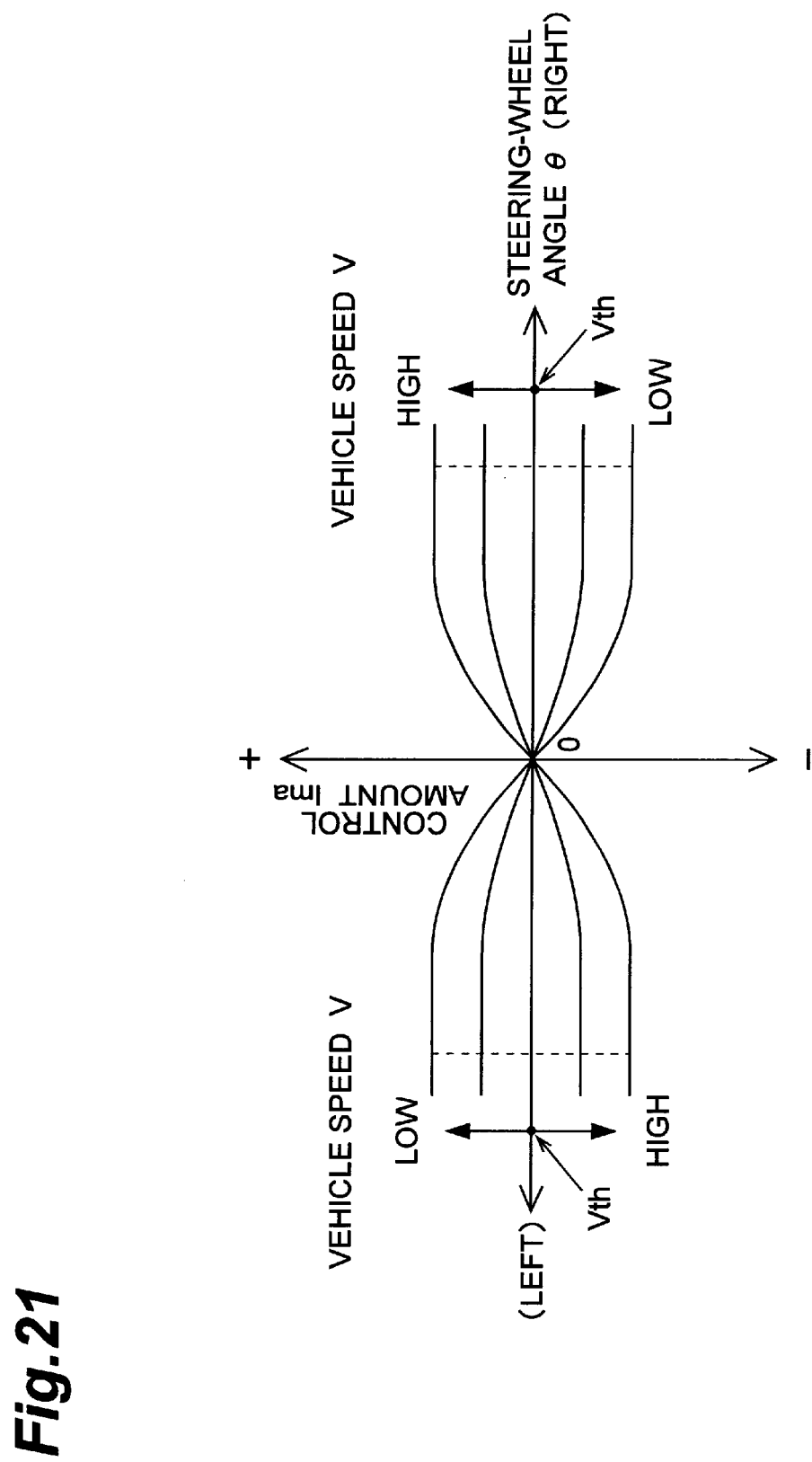
FIG. 21 is a map to specify the relation between steering-wheel angle θ and control amount Ima according to vehicle speed V.

In this case, the control amount Ima is set according to the steering-wheel angle θ and vehicle speed V, for example, based on the map illustrated in FIG. 21. This results in setting the control amount Ima according to the steering-wheel angle θ and vehicle speed V so as to restrain the decrease of the steering reaction force caused by the forward phase shift of the steering reaction force MT, in the high speed range over the threshold Vth of the vehicle speed V and so as to restrain the increase of the steering reaction force caused by the backward phase shift of the steering reaction force MT, in the low speed range below the threshold Vth of the vehicle speed V.

Eq. (12) is just an example, and, for example where Eq. (8) is employed in setting of the target current value Im, values of the coefficients Kla, Kla1, Kla2 may be set each according to the vehicle speed V. Namely, each of the coefficients is set according to the vehicle speed V in such a way that each coefficient is a positive value whose absolute value increases with increase in the vehicle speed V in the high speed range over the threshold Vth of the vehicle speed V and that each coefficient is a negative value whose absolute value increases with decrease in the vehicle speed V in the low speed range. It is also possible in this case to set the target current value Im in consideration of the control amount (corrected control amount) Ima similarly, for example, based on FIG. 21.

In this embodiment the phase control means sets the control amount based on the vehicle speed. One of the factors for changing the phase of the steering reaction force against the steering-wheel angle is variation in the vehicle speed. When the control amount is set based on the vehicle speed, the control can be made so as to restrain the phase change of the steering reaction force against the steering-wheel angle, caused by the variation in the vehicle speed.

In this embodiment, particularly, the phase control means sets the control amount so as to put the phase of the steering reaction force against the steering-wheel angle of the steering wheel forward at high speed and so as to put the phase of the steering reaction force against the steering-wheel angle of the steering wheel backward at low speed. This operation increases the hysteresis width at high speed, so as to enhance the steering stability at high speed, but decreases the hysteresis width at low speed, so as to decrease the steering force and facilitate the reversing operation of the steering wheel.

In each of the embodiments described above the electric power steering mechanism was described as an example of the mechanism capable of electrically controlling the steering reaction force, but the present invention can also be applied to hydraulic power steering mechanisms capable of electrically controlling the steering reaction force, for example.

The assist motor of the power steering mechanism was described as an example of the actuator for exerting the driving force on the steering system, but the assist motor in the power steering mechanism does not always have to be used. The apparatus needs to be provided simply with an actuator capable of exerting the driving force on the steering system so as to control the phase of the steering reaction force MT. Therefore, the phase control described above can also be applied to a steering apparatus without the power steering mechanism or to a steering apparatus of a type in which the steering system and the steered system are mechanically separated and in which the steering reaction force is controlled by a reaction motor.

For example, in the case of the driving control of the actuator for exerting the steering reaction force on the steering system, describing with the example of Eq. (3), the control current value Ips as a control amount for the control of assisting force is unnecessary and the control amount is reversed; therefore, the target current value Im is set as Im=Kla·LA. In the other setting equations for setting the target current value Im, the target current value Im can also be set for the actuator for exerting the steering reaction force on the steering system similarly by eliminating the control current value Ips and reversing the sign of each of the other operation terms.

The fourth embodiment will be described next.

The first to third embodiments showed the examples of control of the steering reaction force MT with attention to the tire reaction force Tsat, and it is also possible to control the phase of the steering reaction force MT by changing the frictional force Tm of the steering system, because the steering reaction force MT is composed as the resultant force of the tire reaction force Tsat and the frictional force Tm of the steering system. The following embodiment is an example of controlling the phase of the steering reaction force MT by changing the frictional force Tm of the steering system.

Figure 22:
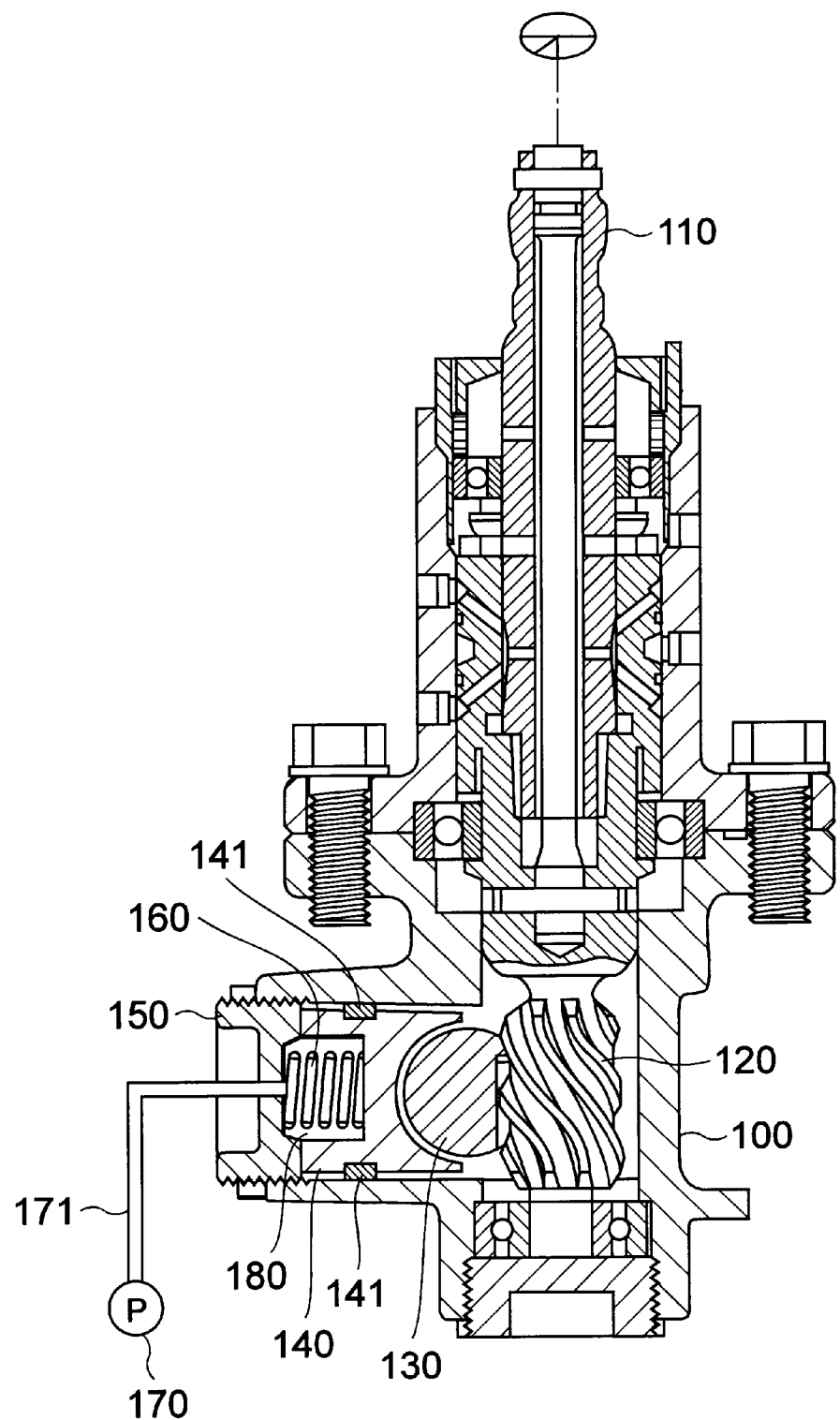
FIG. 22 is a drawing of longitudinal section to show a steering gear box of the rack-and-pinion type.

FIG. 22 shows a rack-and-pinion type steering gear box provided with a mechanism for adjusting the magnitude of the frictional force Tm acting on the steering system. The lower part of this steering gear box composes a rack housing 100 and the rack housing 100 houses a pinion shaft 120 arranged to rotate integrally with the steering shaft 110 and a rack shaft 130 in mesh with this pinion shaft 120.

A rack guide 140, a pedestal 150, etc. are placed on the other side of the rack shaft 130 opposite to the pinion shaft 120. The rack guide 140 is placed so as to be slidable in the rack housing 100 between the pedestal 150 and the rack shaft 130, and the pedestal 150 is tightened in an aperture of the rack housing 100. A space 180 is created between the rack guide 140 and the pedestal 150 and a coil spring 160 is set in this space 180. An oil pump 170 is arranged to supply an oil under a predetermined pressure through an oil pipe 171 into this space 180. In the drawing reference numeral 141 designates an oil seal for preventing a leakage of the oil.

Therefore, the rack guide 140 is arranged so as to urge the rack shaft 130 against the pinion shaft 120 by the resilient force of the coil spring 160 under the reaction from the pedestal 150, and by the oil pressure in the space 180. With increase in the oil pressure inside the space 180, the urging force by the rack guide 140 increases, so as to urge the rack shaft 130 against the pinion shaft 120 more strongly, thereby increasing the frictional force of the steering system. With decrease-in the oil pressure inside the space 180 on the other hand, the frictional force of the steering system decreases. In this way the magnitude of the frictional force acting on the steering system can be changed by varying the oil pressure in the space 180 by means of the oil pump 170. In this case, the hydraulic mechanical part for changing the urging force of the rack guide 140 by the oil pressure as described above serves as an actuator for controlling the phase of the steering reaction force MT.

Figure 23:
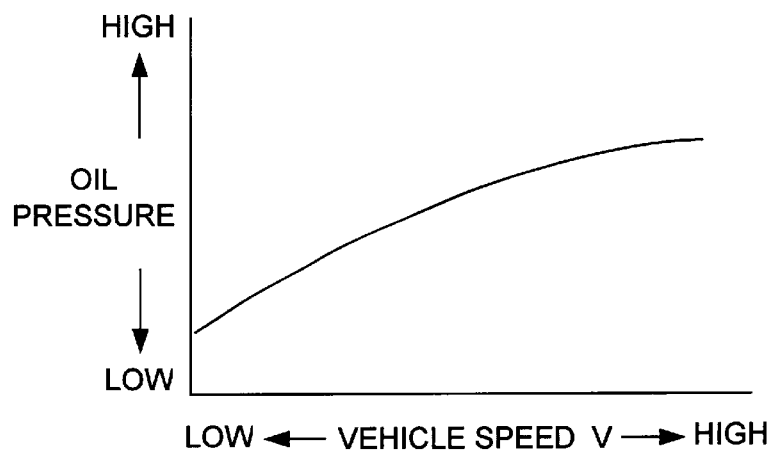
FIG. 23 is a map to specify the relation between vehicle speed V and oil pressure.
Figure 24:
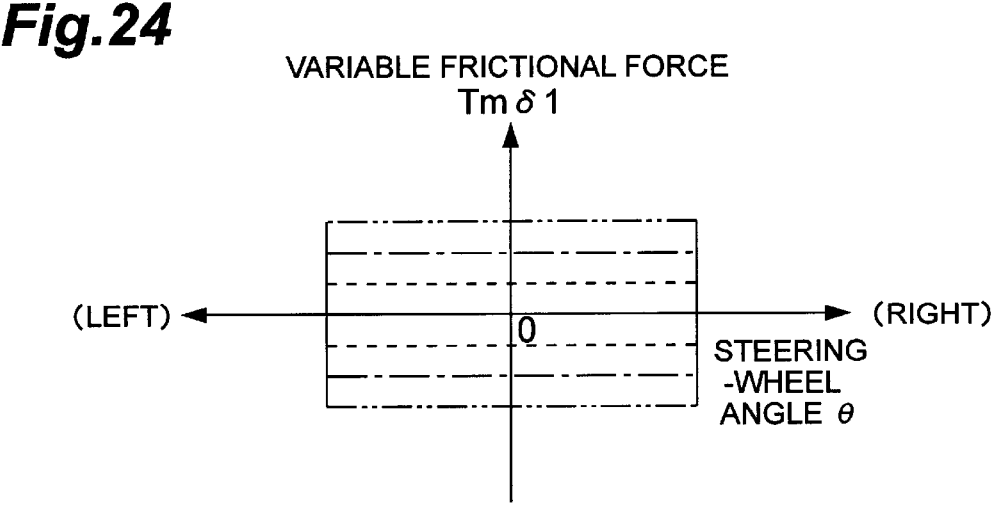
FIG. 24 is a characteristic diagram to show the relation between steering-wheel angle θ and variable frictional force Tmσ1 of the steering system.

For example, as illustrated in FIG. 23, the oil pump 170 is controlled so as to increase the oil pressure in the space 180 with increase in the vehicle speed V. Supposing a variable frictional force Tmσ1 represents the change amount of the frictional force Tm of the steering system with the variation in the oil pressure in the space 180, the relation between the steering-wheel angle θ and the variable frictional force Tmσ1 is as illustrated in FIG. 24; the relation transitions along a frame indicated by a dotted line at low speed, a frame indicated by a chain line at medium speed, and a frame indicated by a chain double-dashed line at high speed. Since the variable frictional force Tmσ1 increases with increase in the vehicle speed V as described above, the frictional force Tm of the steering system also tends to increase with the increase of the vehicle speed V.

As described previously, the phase of the frictional force Tm of the steering system leads that of the steering-wheel angle θ (see FIG. 3), and the phase of the tire reaction force Tsat lags that of the steering-wheel angle θ (see FIG. 4); therefore, the steering reaction force Mt is composed as the resultant force of the frictional force Tm of the steering system and the tire reaction force Tsat. Although the phase lag of the tire reaction force Tsat becomes greater with increase in the vehicle speed V, the influence of the phase lag of the tire reaction force Tsat can be restrained by increasing the frictional force Tm, and as a result the decrease of the hysteresis width can be restrained in the steering-wheel angle versus steering reaction force characteristic at high speed.

Figure 25:
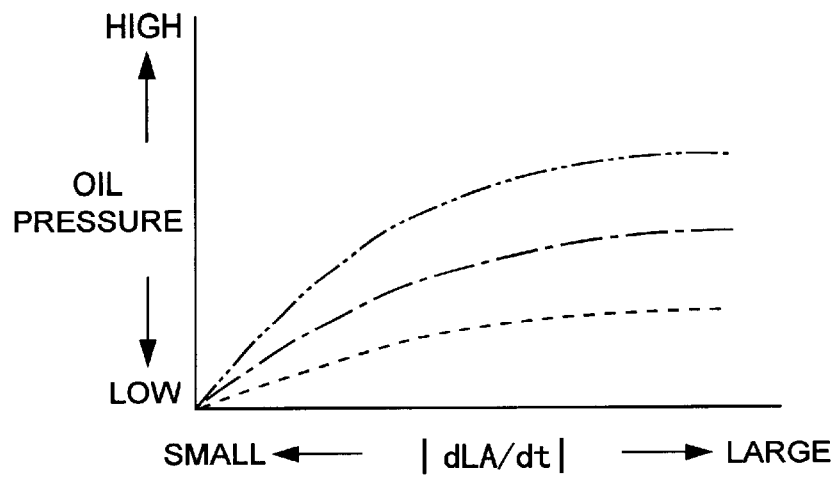
FIG. 25 is a map to specify the relation between differential term |dLA/dt| of lateral acceleration and oil pressure.

It is also possible to adjust the frictional force Tm, based on the differential term of the lateral acceleration LA, which indicates a changing state of the lateral acceleration LA detected. For example, as illustrated in FIG. 25, the oil pump 170 is controlled so as to tend to increase the oil pressure in the space 180 with increase in $|dLA/dt|$ which is the absolute value of the differential term of the lateral acceleration LA. In this case, as the vehicle speed V becomes higher and as the steering speed $|d\theta/dt|$ becomes larger, the characteristics of FIG. 25 transition from the dotted line via the chain line to the chain double-dashed line.

Figure 26:
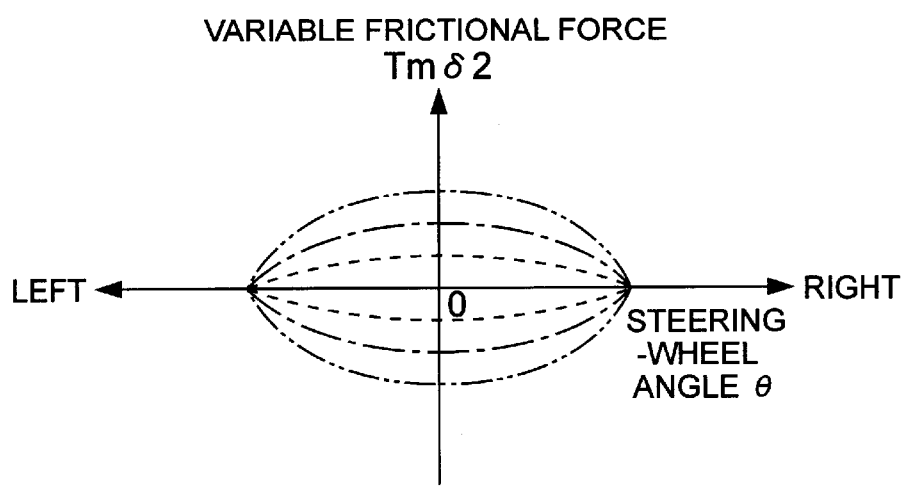
FIG. 26 is a characteristic diagram to show the relation between steering-wheel angle θ and variable frictional force Tmσ2 of the steering system.
Figure 27:
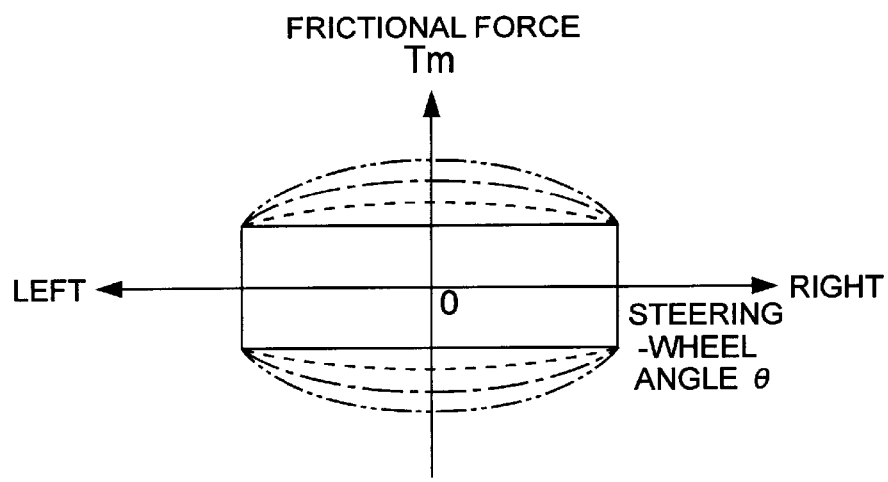
FIG. 27 is a characteristic diagram to show the relation between steering-wheel angle θ and frictional force Tm of the steering system where the variable frictional force Tmσ2 acts.

Supposing a variable frictional force Tmσ2 represents the change amount of the frictional force Tm of the steering system with variation in the oil pressure in the space 180, the relation between the steering-wheel angle θ and the variable frictional force Tmσ2 is as illustrated in FIG. 26 and the relation between the frictional force Tm, which is the total frictional force acting on the steering system, and the steering-wheel angle θ is as illustrated in FIG. 27. In this case, as the set oil pressure in the space 180 becomes larger, the characteristics of FIG. 26 and FIG. 27 transition from the dotted line via the chain line to the chain double-dashed line.

When the variable frictional force Tmσ2 is adjusted based on the differential term of the lateral acceleration LA as described above, the frictional force Tm of the steering system can be changed so as to increase the frictional force near the steering-wheel angle θ=0 where the steering is near the neutral position, when compared with the both side areas where the steering-wheel angle |θ| is large.

Further, a total variable frictional force Tmσ can also be set by combining the variable frictional forces Tmσ1, Tmσ2 set as described above. For example, supposing K1, K2, K3, and K4 are positive coefficients, the total variable frictional force Tmσ is set to Tmσ=K1·Tmσ1+K2·Tmσ2 in the high speed range and to Tmσ=K3·Tmσ1−K4·Tmσ2 in the low speed range.

Figure 28:
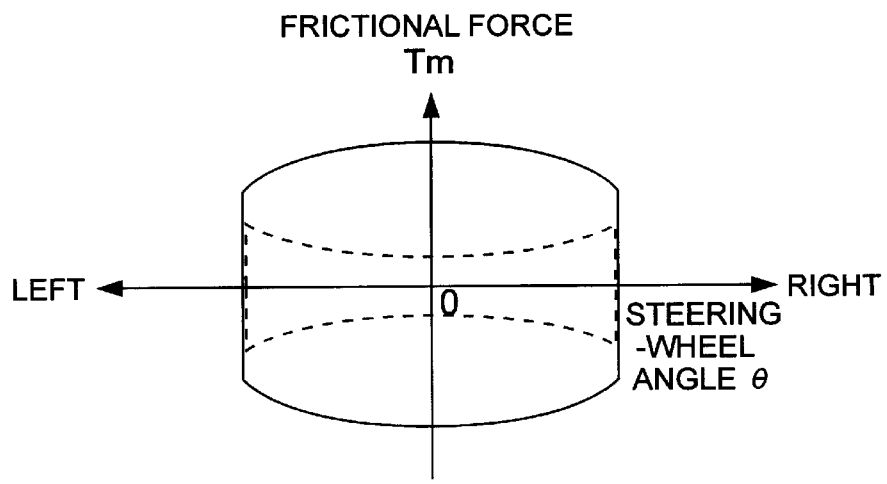
FIG. 28 is a characteristic diagram to show the relation between steering-wheel angle θ and frictional force Tm of the steering system.

When the total variable frictional force Tmσ is set as described above, the relation between the frictional force Tm, which is the total frictional force acting on the steering system, and the steering-wheel angle θ is as illustrated in FIG. 28; the relation in the high speed range is one indicated by a solid line and the relation in the low speed range one by a dotted line. Therefore, the control can be made as follows: the frictional force Tm is increased relatively in the high speed range and, particularly, the frictional force Tm is increased near the steering-wheel angle θ=0; on the other hand, the frictional force Tm is decreased relatively in the low speed range and, particularly, the frictional force Tm is controlled to a low level near the steering-wheel angle θ=0.

Supposing the phase difference of the tire reaction force Tsat from the steering-wheel angle θ is constant, the above control of the frictional force Tm acts so as to advance the phase of the steering reaction force MT against the steering-wheel angle θ further with increase in the frictional force Tm. This action can increase the hysteresis width in the steering-wheel angle θ versus steering reaction force MT characteristic.

Figures 29A, 29B:
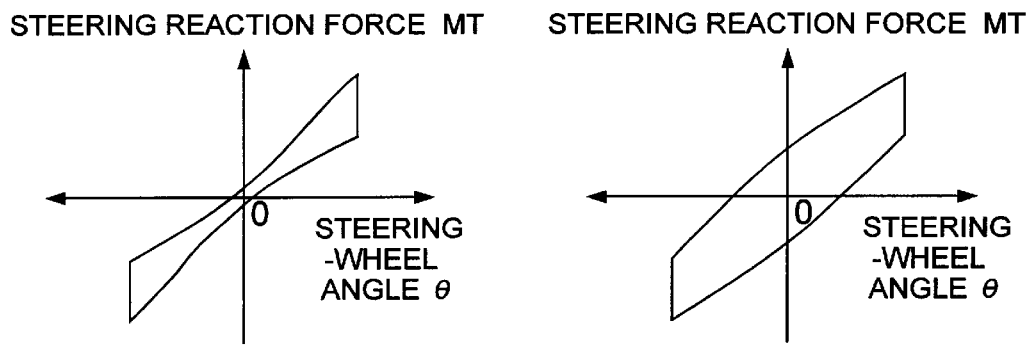
FIG. 29A is a characteristic diagram to show a characteristic of steering-wheel angle θ versus steering reaction force MT at high speed.
FIG. 29B is a characteristic diagram of steering-wheel angle θ versus steering reaction force MT to show change appearing when the frictional force of the steering system is controlled.

For example, in the high vehicle speed range the hysteresis width near the steering-wheel angle θ=0 is decreased by the increase of the phase lag of the tire reaction force Tsat behind the steering-wheel angle θ, as illustrated in FIG. 29A. In this case, by controlling the frictional force Tm as indicated by the solid line of FIG. 28, the phase of the steering reaction force MT can be put forward, particularly, near the steering-wheel angle θ=0, and this action can increase the hysteresis width near the steering-wheel angle θ=0 as illustrated in FIG. 29B.

Figures 30A, 30B:
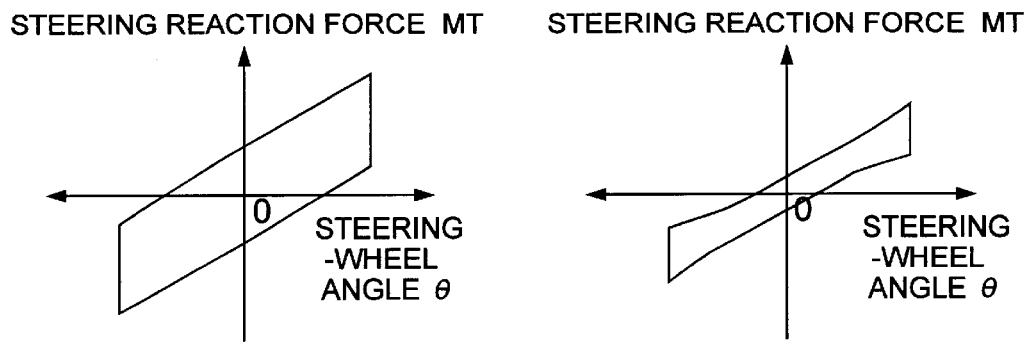
FIG. 30A is a characteristic diagram to show a characteristic of steering-wheel angle θ versus steering reaction force MT at low speed.
FIG. 30B is a characteristic diagram of steering-wheel angle θ versus steering reaction force MT to show change appearing when the frictional force of the steering system is controlled.

When a relatively large frictional force is preliminarily exerted as the frictional force Tm of the steering system, the steering-wheel angle θ versus steering reaction force MT characteristic in the low speed range is, for example, as illustrated in FIG. 30A. In this case, the frictional force Tm is decreased in the whole area of the steering-wheel angle θ, for example, by controlling the frictional force as indicated by the dotted line of FIG. 28. This results in decreasing the degree of the phase lead of the steering reaction force MT ahead the steering-wheel angle θ more. This action can decrease the hysteresis width in the whole area of the steering-wheel angle θ as illustrated in FIG. 30B, whereby the steering feeling can be made lighter in the whole area of the steering-wheel angle θ at low speed.

The fourth embodiment was described as the example in which the oil pump 170 for changing the oil pressure in the space 180 was provided as illustrated in FIG. 22, but the power steering mechanism of the hydraulic type mounted on the vehicle can also be utilized as the oil pressure generating mechanism as it is.

Figure 31A:
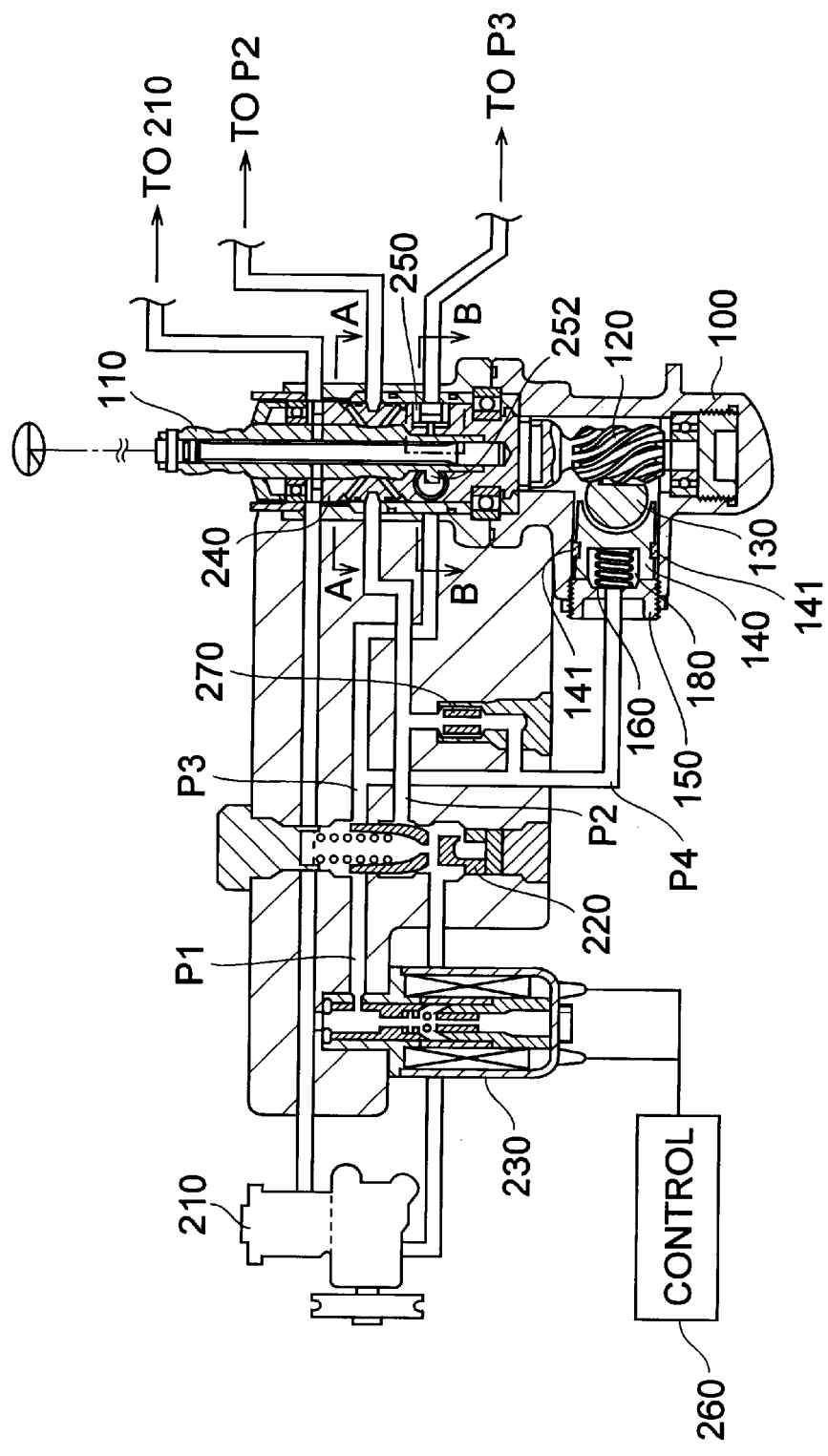
FIG. 31A is a structural diagram to show a friction control mechanism of the steering system making use of a power steering mechanism of a hydraulic type.
Figure 31B:
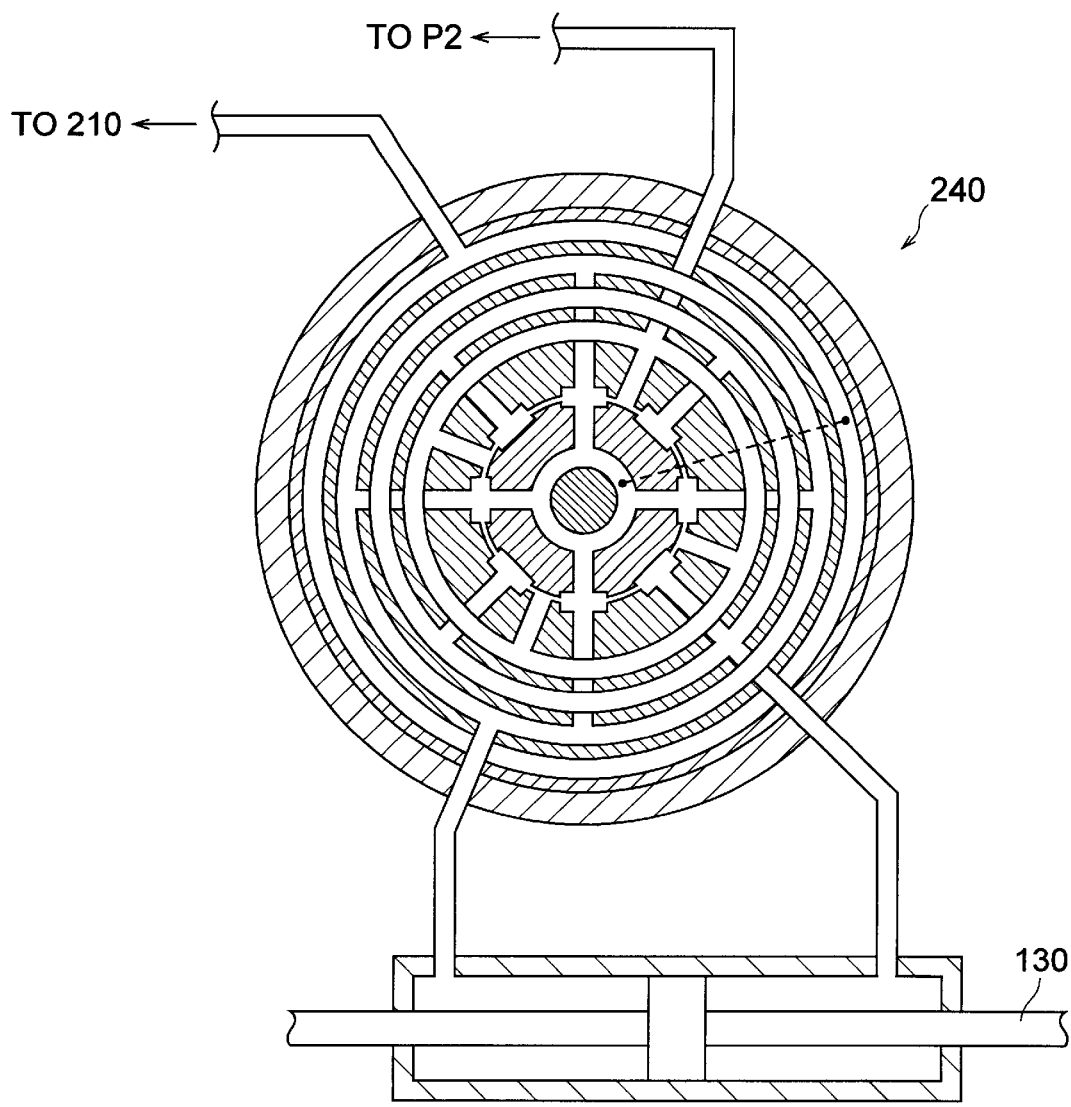
FIG. 31B is a sectional view along line A—A in FIG. 31A.
Figure 31C:
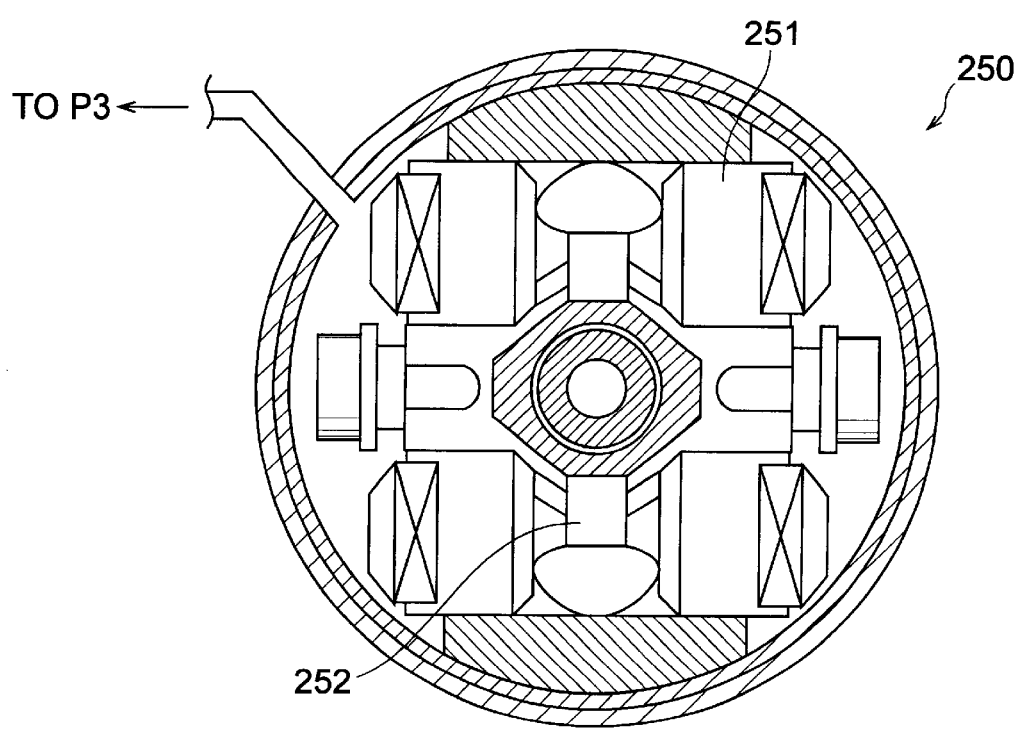
FIG. 31C is a sectional view along line B—B in FIG. 31A.

FIG. 31A to FIG. 31C show the structure of such a mechanism. In the figures the same members as those in FIG. 22 are denoted by the same reference numerals.

An oil delivered from a vane pump 210 flows into a flow dividing valve 220 to be branched into a flow path P1 toward a solenoid valve 230, a flow path P2 toward a rotary valve 240, and a flow path P3 toward a hydraulic reaction chamber 250. The flow path P3 is branched midway to a flow path P4 and the flow path P4 is connected to the space 180. Therefore, the oil pressure in the space 180 varies with change in the oil pressure in the hydraulic reaction chamber 250. The hydraulic reaction chamber 250 houses a control valve shaft 252 interlocking with the steering shaft 110, a plunger 251 for urging the control valve shaft 252 under action of the oil pressure on the back side, and so on.

Figure 32:
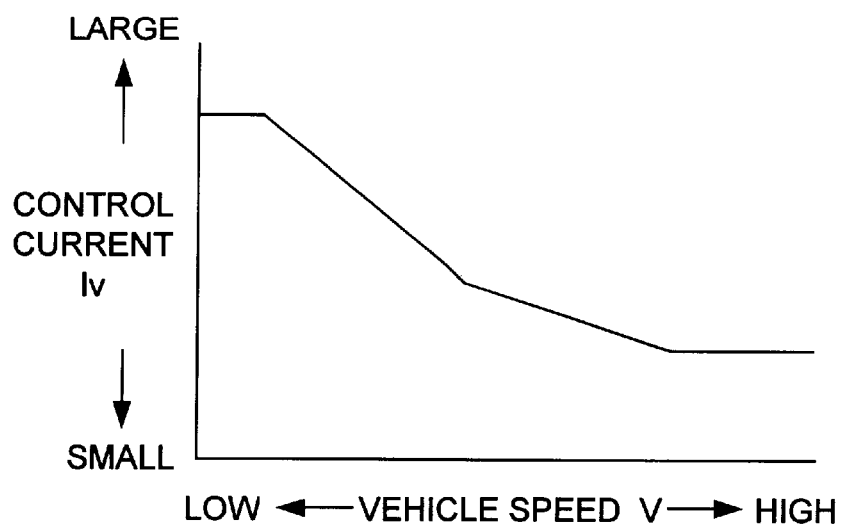
FIG. 32 is a map to specify the relation between vehicle speed V and control current Iv of a solenoid valve.
Figure 33:
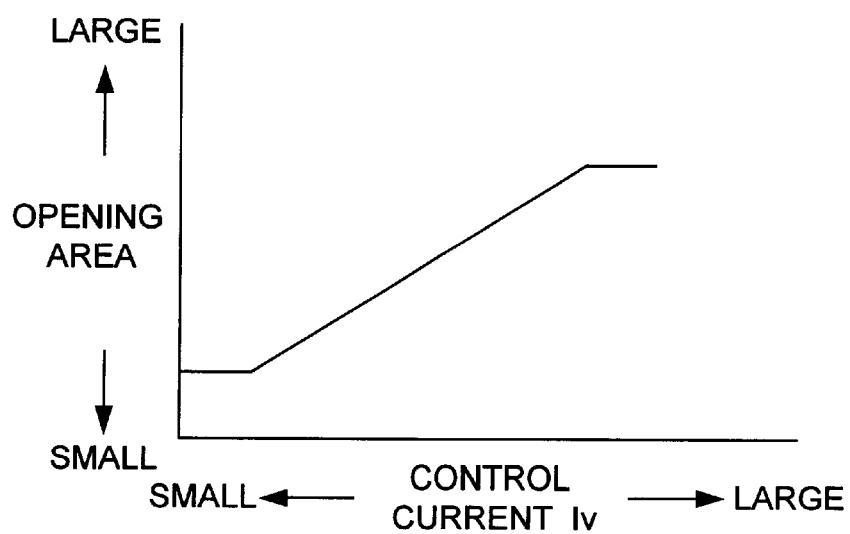
FIG. 33 is a map to show the relation between control current Iv of the solenoid valve and aperture area of a flow dividing valve.

During straight-ahead running of the vehicle the oil pressure of the circuit is controlled by changing an opening area (valve travel) of the solenoid valve 230 opening to the flow path P1 under control of the control unit 260. The control unit 260 outputs a control current Iv according to the vehicle speed V, for example as illustrated in FIG. 32, to the solenoid valve 230 and an opening characteristic of the solenoid valve 230 against the control current Iv is, for example, as illustrated in FIG. 33.

The higher the vehicle speed V, the smaller the opening area of the solenoid vale 230 accordingly; this increases the oil pressure in the hydraulic reaction chamber 250 and also increases the oil pressure in the space 180 in the rack housing 100 at the same time, thus increasing the frictional force acting on the steering system. In the medium and high speed range the valve opening of the rotary valve 240 is decreased with manipulation of the steering wheel to increase the oil pressure in the flow path P2 toward the rotary valve 240 and increase the oil pressure in the flow paths P3 and P4 therewith. Further, with the increase of the oil pressure in the flow path P2, the oil is supplied through a fixed orifice 270 into the flow path P4, so as to increase the oil pressure more in the flow paths P3 and P4. This action increases the oil pressure more in the space 180 during steering in running in the medium and high speed range, so as to increase the frictional force acting on the steering system further.

The frictional force of the steering system can also be changed by making use of the power steering mechanism of the hydraulic type as described above.

The fourth embodiment described above showed the example in which the fictional force of the steering system was changed according to the differential term of the lateral acceleration LA, but the frictional force acting on the steering system may also be controlled based on a signal obtained by properly setting the angle "α" as a phase lead angle or as a phase lag angle as indicated by Eq. (11), instead of this differential term, and changing the phase of the detection result of the lateral acceleration LA.

The fourth embodiment employed the lateral acceleration LA as an example of the detection result corresponding to the magnitude of the external force acting from the wheels on the steering system, but the lateral acceleration LA can be replaced by either of the detection results of the yaw rate Yr and vehicle speed V, the axial force Fr acting-on the axle shaft 52, or the load current value Ir of the assist motor 54 (see FIG. 10).

Further, the frictional force Tm of the steering system may also be controlled similarly, based on the steering-wheel angle θ, the stroke position of the rack shaft 130, etc., which can represent the mechanical displacement position according to manipulation of the steering wheel 50, in addition to the detection result corresponding to the magnitude of the external force acting on the steering system.

The fourth embodiment was arranged to change the frictional force acting on the steering system by varying the oil pressure in the space 180, but the tightening position of the pedestal 150 may also be controlled by rotating the pedestal 150 tightened on the rack housing 100 by means of an actuator such as a motor or the like, for example. In this case, the frictional force of the steering system can be varied as the urging force of the coil spring 160 urging the rack guide 140 is changed by forward or backward motion of the pedestal 150.

Figure 34:
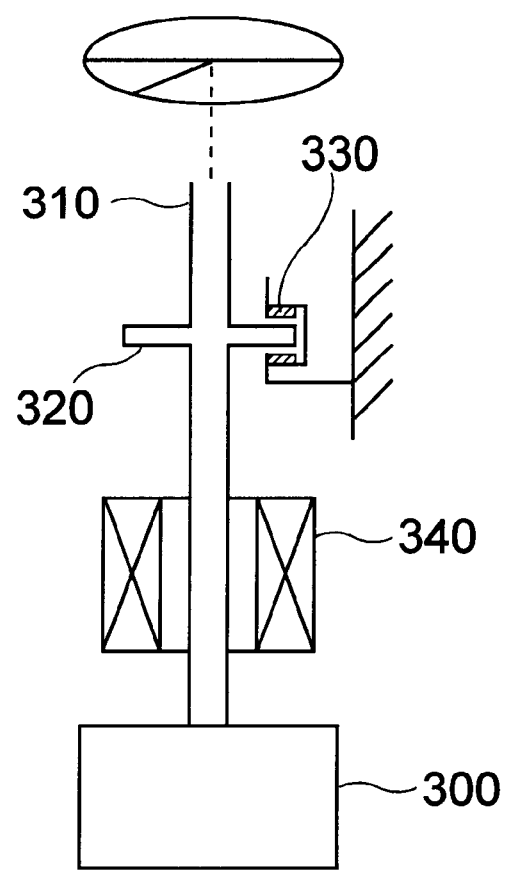
FIG. 34 is an explanatory diagram to schematically show a friction exerting mechanism which is compatible with a steering apparatus for controlling the steering reaction force by a reaction motor.

This control of the frictional force can also be applied to the steering apparatus of a type in which the steering system and the steered system are separated mechanically and in which the steering reaction force is controlled by a reaction motor 300, as illustrated in FIG. 34. In this case, a frictional force controlling mechanism can be, for example, a so-called disk brake in which a disk 320 integral with the steering shaft 310 is pinched by brake pads 330 to generate the frictional force against the rotating direction of the steering shaft 310. In this mechanism the frictional force of the steering system can be controlled, for example, by controlling the oil pressure or the like which generates the pinching force of the brake pads.

A coil 340 is placed around the steering shaft 310, and thus an electric actuator is composed of a stator of the coil 340 and a rotor of the steering shaft 310. In this structure the reaction force against the rotating direction of the steering shaft 310 can also be exerted by electromagnetic force generated between the coil 340 and the steering shaft 310. In this case, the reaction force of the steering system can be controlled by controlling the current flowing in the coil 340.

In this embodiment, the apparatus is further provided with the frictional force adjusting means for changing the frictional force acting on the steering system, by the driving force of the actuator. Since the reaction force based on the frictional force of the steering system is also one of the component forces of the steering reaction force, the phase of the steering reaction force can also be controlled by changing this frictional force. Since the reaction force based on this frictional force is a force against the steering direction, it has a phase lead ahead the change of the steering-wheel angle of the steering wheel. The degree of the phase lead ahead the steering-wheel angle is changed by varying the frictional force acting on the steering system by the frictional force adjusting means accordingly. In this way the phase of the steering reaction force acting on the steering wheel is controlled by varying the frictional force of the steering system and combining it with the reaction force based on the external force acting on the steering system.

As described above, the steering control apparatus of the present invention is constructed by employing the structure having the actuator for exerting the driving force on the steering system and the phase control means for controlling the phase of the steering reaction force acting on the steering wheel by controlling the driving of the actuator. Therefore, the apparatus can control the hysteresis width in the steering-wheel angle versus steering reaction force characteristic, whereby the hysteresis width can be set arbitrarily or can be changed suitably, without modification of the mechanical structure.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A steering control apparatus comprising:
   a steering wheel;
   steered road wheels;
   a steering system between said steering wheel and said steered road wheels;
   an actuator interposed in said steering system, for exerting a driving force on the steering system; and
   phase control means for controlling a phase of a steering reaction force acting on said steering wheel through said steering system, by controlling driving of said actuator.

2. The steering control apparatus according to claim 1, wherein the driving force of said actuator is made to act along a movable direction of said steering system.

3. The steering control apparatus according to claim 1, further comprising frictional force adjusting means for varying a frictional force acting on said steering system, by the driving force of said actuator.

4. The steering control apparatus according to claim 1, wherein said phase control means sets a control amount for said actuator so as to put the phase of said steering reaction force against a steering-wheel angle of said steering wheel forward.

5. The steering control apparatus according to claim 1, wherein said phase control means sets a control amount for said actuator so as to put the phase of said steering reaction force against a steering-wheel angle of said steering wheel backward.

6. The steering control apparatus according to claim 1, wherein said phase control means sets a control amount for said actuator, based on vehicle speed.

7. The steering control apparatus according to claim 6, wherein said phase control means sets said control amount so as to put the phase of said steering reaction force against a steering-wheel angle of said steering wheel forward at high speed and so as to put the phase of said steering reaction force against the steering-wheel angle of said steering wheel backward at low speed.

8. The steering control apparatus according to claim 1, wherein said phase control means sets a control amount for said actuator, based on a detection result which directly or indirectly indicates an external force acting from said steered road wheels on said steering system.

9. The steering control apparatus according to claim 8, wherein said phase control means sets said control amount, based on a changing state of said detection result in addition.

10. The steering control apparatus according to claim 8, wherein said phase control means changes a phase of a signal indicating said detection result, and sets said control amount based on said detection result after the change of the phase.

11. The steering control apparatus according to claim 1, wherein said phase control means sets a control amount for said actuator, based on a detection result indicating a mechanical displacement according to manipulation of said steering wheel.

12. The steering control apparatus according to claim 11, wherein said phase control means sets said control amount, based on a changing state of said detection result in addition.

13. The steering control apparatus according to claim 11, wherein said phase control means changes a phase of a signal indicating said detection result, and sets said control amount based on said detection result after the change of the phase.

14. The steering control apparatus according to claim 1, wherein said phase control means sets a corrected control amount for said actuator, based on a mechanical displacement according to manipulation of said steering wheel, so as to restrain change of said steering reaction force caused by change of the phase.

15. The steering control apparatus according to claim 14, wherein said phase control means changes said corrected control amount further according to vehicle speed.

* * * * *